US007957526B2

(12) United States Patent
Fujiwara et al.

(10) Patent No.: US 7,957,526 B2
(45) Date of Patent: *Jun. 7, 2011

(54) CONFIDENTIAL INFORMATION IMPLEMENTATION SYSTEM AND LSI

(75) Inventors: Makoto Fujiwara, Kyoto (JP); Yuusuke Nemoto, Hyogo (JP)

(73) Assignee: Panasonic Corporation, Osaka (JP)

( * ) Notice: Subject to any disclaimer, the term of this patent is extended or adjusted under 35 U.S.C. 154(b) by 1054 days.

This patent is subject to a terminal disclaimer.

(21) Appl. No.: 11/474,379

(22) Filed: Jun. 26, 2006

(65) Prior Publication Data

US 2007/0003058 A1  Jan. 4, 2007

(30) Foreign Application Priority Data

Jul. 1, 2005  (JP) ............................... P2005-193948

(51) Int. Cl.
*H04L 9/00* (2006.01)
*G06F 13/00* (2006.01)

(52) U.S. Cl. .............. 380/44; 380/45; 380/46; 380/264; 711/103

(58) Field of Classification Search ................... 380/44, 380/45, 46, 264; 711/103
See application file for complete search history.

(56) References Cited

U.S. PATENT DOCUMENTS 5,201,000 A * 4/1993 Matyas et al. ................. 380/30
5,559,889 A 9/1996 Easter et al.
(Continued)

FOREIGN PATENT DOCUMENTS

EP 1 185 022 A 3/2002

JP 01-270684 10/1989
(Continued)

OTHER PUBLICATIONS

Japanese Office Action, with English Translation, issued in Japanese Patent Application No. 2005-193948, dated Jan. 14, 2009.
(Continued)

*Primary Examiner* — Ponnoreay Pich
*Assistant Examiner* — Sayed Beheshti Shirazi
(74) *Attorney, Agent, or Firm* — McDermott Will & Emery LLP

(57) ABSTRACT

A security information implementation system includes a storage section 120a for storing first encrypted security information EDK (MK) provided by encrypting final security information DK according to internal security information MK and second encrypted security information EMK (CK) provided by encrypting the internal security information MK according to conversion security information CK and an LSI 120b including a seed generation section 131 for storing a first constant value containing address information on which a conversion seed is generated based and a second constant value and a third constant value on which a test conversion seed is generated based and outputting the first constant value and the second constant value or the third constant value as the conversion seed or the test conversion seed in response to a test signal and a mode setup value; a one-way function circuit 32 for converting the conversion seed or the test conversion seed output from the seed generation section 131 according to the first encrypted security information EDK (MK) input from the storage section 120a to generate the conversion security information CK or test conversion security information; a decryption circuit 33 for decrypting the second encrypted security information EMK (CK) input from the storage section 120a using the output of the one-way function circuit 32 as a key; and a decryption circuit 34 for decrypting the first encrypted security information EDK (MK) input from the storage section 120a using the output of the decryption circuit 33 as a key.

37 Claims, 22 Drawing Sheets

U.S. PATENT DOCUMENTS

| | | | |
|---|---|---|---|
| 5,563,950 A | 10/1996 | Easter et al. | |
| 6,615,348 B1 * | 9/2003 | Gibbs | 713/162 |
| 7,133,524 B2 * | 11/2006 | Fujiwara et al. | 380/45 |
| 7,424,622 B2 * | 9/2008 | Hashimoto et al. | 713/194 |
| 7,545,934 B2 * | 6/2009 | Fujiwara et al. | 380/45 |
| 2002/0194476 A1 * | 12/2002 | Lewis et al. | 713/169 |
| 2003/0074571 A1 * | 4/2003 | Fujiwara et al. | 713/191 |
| 2004/0174997 A1 * | 9/2004 | Yamamichi et al. | 380/44 |
| 2005/0018854 A1 * | 1/2005 | Yamamoto et al. | 380/277 |
| 2005/0131990 A1 * | 6/2005 | Jewell | 709/201 |
| 2005/0226410 A1 * | 10/2005 | Fujiwara et al. | 380/28 |
| 2006/0059434 A1 * | 3/2006 | Boss et al. | 715/780 |
| 2006/0101288 A1 * | 5/2006 | Smeets et al. | 713/194 |
| 2006/0265563 A1 * | 11/2006 | Goettfert et al. | 711/164 |
| 2007/0185793 A1 * | 8/2007 | George | 705/35 |
| 2007/0203957 A1 * | 8/2007 | Desai et al. | 707/204 |

FOREIGN PATENT DOCUMENTS

| | | |
|---|---|---|
| JP | 04-135260 | 5/1992 |
| JP | 2003-101527 | 4/2003 |
| JP | 2004-096666 | 3/2004 |
| JP | 2005-294952 | 10/2005 |

OTHER PUBLICATIONS

European Search Report issued in European Patent Application No. EP 06116117 dated Jun. 3, 2009.

* cited by examiner

CONFIDENTIAL INFORMATION IMPLEMENTATION SYSTEM AND LSI

BACKGROUND OF THE INVENTION

1. Field of the Invention

This invention relates to a security information implementation system and an LSI for providing the system.

2. Description of the Related Art

Key information required for decrypting encrypted information is embedded in a storage device storing content to be copyrighted such as a DVD or an SD card, a system LSI of a terminal for playing back or demodulating the storage device, and the like.

The key information is a strictly security item for not only the user, but also the manufacturer of the terminal for copyright protection and preventing unauthorized use of the terminal. That is, the key information is strictly managed at the development stage of a system LSI in which the key information is embedded, the fuse implementation stage, one of the manufacturing steps of the system LSI, and the set implementation stage of combining the system LSI with memory, etc., to manufacture the terminal.

The applicant previously disclosed a key implementation system wherein security information concerning a key-implemented system and an LSI used therewith is distributed, whereby the security and concealment of the key can be improved and various security keys can also be easily implemented and further it is made possible to test the implemented value without increasing the circuit scale. (For example, refer to JP-A-2003-101527, FIG. 18.)

FIG. 18 is a block diagram to show the schematic configuration to describe a key implementation system 7 disclosed in the patent document. In the description to follow, it is assumed that symmetric cryptography is adopted for encryption and decryption processing. The "symmetric cryptograph" has the following characteristic: Assuming that the encryption result of A as input using a key B by an encryption circuit 50 is C, the decryption result of the input C using the key B by a decryption circuit 51 becomes A, as shown in FIG. 19. The encrypted key provided by encrypting X using a key Y is represented as EX (Y).

An LSI 70 includes a first selector 64 for inputting second and third inputs IN2 and IN3 and selectively outputting either of them in response to a test signal TEST. A first decryption circuit X 33 inputs the output of the first selector 64. The LSI 70 is provided with a seed generation section 71 including a first constant storage section 72, a second selector 73, a second constant storage section 74, and a second one-way function circuit B 75.

The first constant storage section 72 stores a first constant IDfuse on which a conversion seed IDfuse1 is based and a second constant IDtst on which a test conversion seed IDtst1 is based. The first constant storage section 72 is configured so that any desired values can be implemented by fuse blowing by laser trimming, etc., as the first constant IDfuse and the second constant IDtst.

The second selector 73 selectively outputs either of the first and second constants IDfuse and IDtst in response to a test signal TEST. The second constant storage section 74 stores a third constant Const. The second one-way function circuit B 75 converts the third constant Const as a conversion seed by a one-way function using the output of the second selector 73.

The LSI 70 includes a first one-way function circuit A 32 for converting the output of the second one-way function circuit B 75 as a conversion seed by a one-way function using the first input IN1 to generate a conversion key CK or a test conversion key CKtst, a first decryption circuit X 33 for decrypting the output of the first selector 64 using the output of the first one-way function circuit A 32 as a key, and a second decryption circuit Y 34 for decrypting the first input IN1 using the output of the first decryption circuit X 33 as a key.

The LSI 70 is provided with a verification circuit 65 for verifying the output of the second selector 73. The verification circuit 65 includes a constant storage section 66 wherein a constant CRCfuse corresponding to the result of redundancy operation on the constant IDfuse is fuse-implemented and a comparison circuit 67 for performing the above-mentioned redundancy operation on the output of the second selector 73 and making a comparison between the operation result and the constant CRCfuse stored in the constant storage section 66.

First, the operation at the inspection time of the LSI 70 will be discussed. In this case, the test signal TEST is set to "1." At this time, the first selector 64 receives "1" as the test signal TEST and selects and outputs the input IN3, namely, a third encrypted key EMKtst (CKtst). The second selector 73 receives "1" as the test signal TEST and selects and outputs the second constant IDtst stored in the first constant storage section 72.

The second one-way function circuit B 75 converts the third constant Const stored in the second constant storage section 74 by a one-way function using the output of the second selector 73, namely, the second constant IDtst. That is, the seed generation section 71 outputs the test conversion seed IDtst1 as a conversion seed.

The first one-way function circuit A 32 converts the test conversion seed IDtst1 output from the seed generation section 71 by a one-way function corresponding to the function used to generate the test conversion key CKtst using first input IN1, namely, a first encrypted key EDK (MK). Accordingly, the one-way function circuit A 32 generates and outputs the test conversion key CKtst.

The first decryption circuit X 33 decrypts the output of the first selector 64, namely, the third encrypted key EMKtst (CKtst) using the output of the first one-way function circuit A 32, namely, the test conversion key CKtst as a key. Accordingly, the first decryption circuit X 33 generates and outputs a test internal key MKtst. The second decryption circuit Y 34 decrypts the first input IN1, namely, the first encrypted key EDK (MK) using the output of the first decryption circuit X 33, namely, the test internal key MKtst as a key. Accordingly, the second decryption circuit Y 34 generates a test final key DKtst.

Next, the operation at the usual time of the LSI 70 will be discussed. In this case, the test signal TEST is set to "0." At this time, the first selector 64 receives "0" as the test signal TEST and selects and outputs the input IN2, namely, a second encrypted key EMK (CK). The second selector 73 receives "0" as the test signal TEST and selects and outputs the first constant IDfuse stored in the first constant storage section 72.

The second one-way function circuit B 75 converts the third constant Const stored in the second constant storage section 74 by a one-way function using the output of the second selector 73, namely, the first constant IDfuse. Accordingly is, the seed generation section 71 outputs the conversion seed IDfuse1.

The first one-way function circuit A 32 converts the conversion seed IDfuse1 output from the seed generation section 71 by a one-way function corresponding to the function used to generate the conversion key CK using the first encrypted key EDK (MK). Accordingly, the one-way function circuit A 32 generates and outputs the conversion key CK.

The first decryption circuit X 33 decrypts the output of the first selector 64, namely, the second encrypted key EMK (CK) using the output of the first one-way function circuit A 32, namely, the conversion key CK as a key. Accordingly, the first decryption circuit X 33 generates and outputs an internal key MK. The second decryption circuit Y 34 decrypts the first input IN1, namely, the first encrypted key EDK (MK) using the output of the first decryption circuit X 33, namely, the internal key MK as a key. Accordingly, the second decryption circuit Y 34 generates a final key DK.

At this time, the output of the second selector 73 is also input to the comparison circuit 67 in the verification circuit 65. The comparison circuit 67 checks whether or not the result of the redundancy operation on the output of the second selector 73 and the CRCfuse fuse-implemented in the constant storage section 66 are the same. Accordingly, the second IDfuse stored in the seed generation section 71 can be checked for validity.

In the key implementation system in the related art described above, from a terminal, a system LSI, or a storage section drained out by fraudulent means, the manufacturer, etc., manufacturing the terminal, the system LSI, or the storage section cannot be identified. If specific security information is leaked, terminals or system LSIs that can perform usual operation can be manufactured in large quantity by copying the specific security information, and the copyright cannot sufficiently be protected.

In the key implementation system in the related art described above, protecting security information based on IDfuse varying from one machine to another or using one desired fixed value cannot be selected in response to the security information. Thus, flexible implementation cannot be accomplished.

SUMMARY OF THE INVENTION

It is an object of the invention to provide a security information implementation system and an LSI for making it possible to identify from a terminal, a system LSI, or a storage section drained out by fraudulent means, the manufacturer, etc., manufacturing the terminal, the system LSI, or the storage section for strictly managing security information.

According to the invention, there is provided a security information implementation system including a storage section for storing first encrypted security information provided by encrypting final security information according to internal security information and second encrypted security information provided by encrypting the internal security information according to conversion security information and an LSI including a seed generation section for storing a first constant containing address information on which a conversion seed is generated based and a second constant and a third constant on which a test conversion seed is generated based and outputting the first constant and the second constant or the third constant as the conversion seed or the test conversion seed in response to a test signal and a mode setup value; a one-way function circuit for converting the conversion seed or the test conversion seed output from the seed generation section according to the first encrypted security information input from the storage section to generate the conversion security information or test conversion security information; a first decryption circuit for decrypting the second encrypted security information input from the storage section using the output of the one-way function circuit as a key; and a second decryption circuit for decrypting the first encrypted security information input from the storage section using the output of the first decryption circuit as a key.

According to the invention, there is provided an LSI to which first encrypted security information provided by encrypting final security information according to internal security information and second encrypted security information provided by encrypting the internal security information according to conversion security information are input, the LSI including a seed generation section for storing a first constant containing address information on which a conversion seed is generated based and a second constant and a third constant on which a test conversion seed is generated based and outputting the first constant and the second or third constant as the conversion seed or the test conversion seed in response to a test signal and a mode setup value; a one-way function circuit for converting the conversion seed or the test conversion seed output from the seed generation section according to the first encrypted security information to generate the conversion security information or test conversion security information; a first decryption circuit for decrypting the second encrypted security information using the output of the one-way function circuit as a key; and a second decryption circuit for decrypting the first encrypted security information using the output of the first decryption circuit as a key.

According to the invention, the address information is associated with the encrypted security information, whereby it is made possible to identify from a terminal, a system LSI, or a storage section drained out by fraudulent means, the manufacturer, etc., manufacturing the terminal, the system LSI, or the storage section for strictly managing the security information.

DESCRIPTION OF THE PREFERRED EMBODIMENTS

Referring now to the accompanying drawings, there are shown a preferred embodiment of the invention. First, license management, namely, a license scheme for licensing security information required at the stages of developing, manufacturing, inspecting, and implementing a security information implementation system of one embodiment of the invention to a manufacturer will be discussed. The security information contains all information that needs to be made security, such as keys, parameters, an encryption algorithm, and a conversion table.

Figure 1:
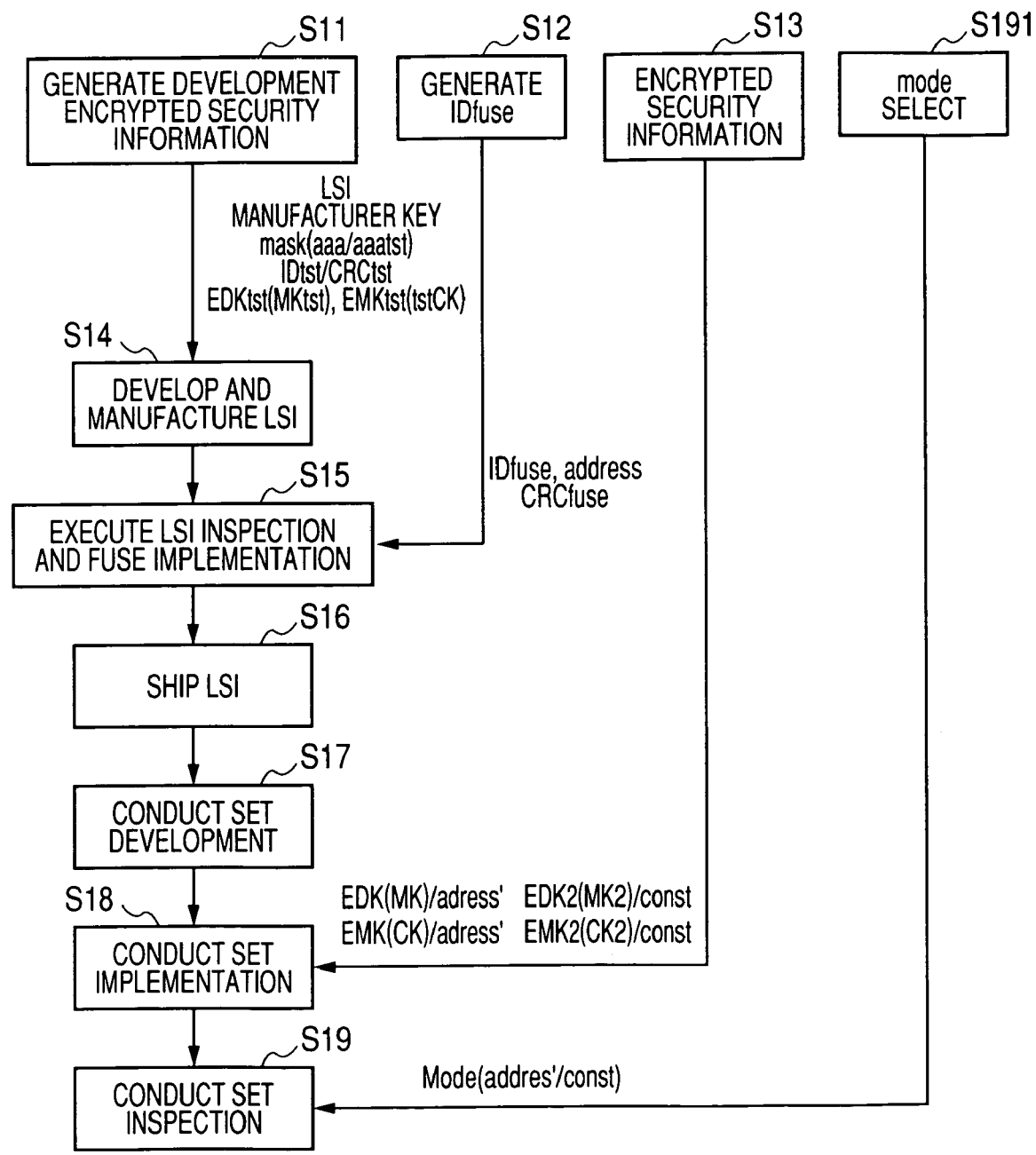
FIG. 1 is a flowchart to describe all processes until implementation of a security information implementation system of an embodiment of the invention in a terminal.
Figure 2:
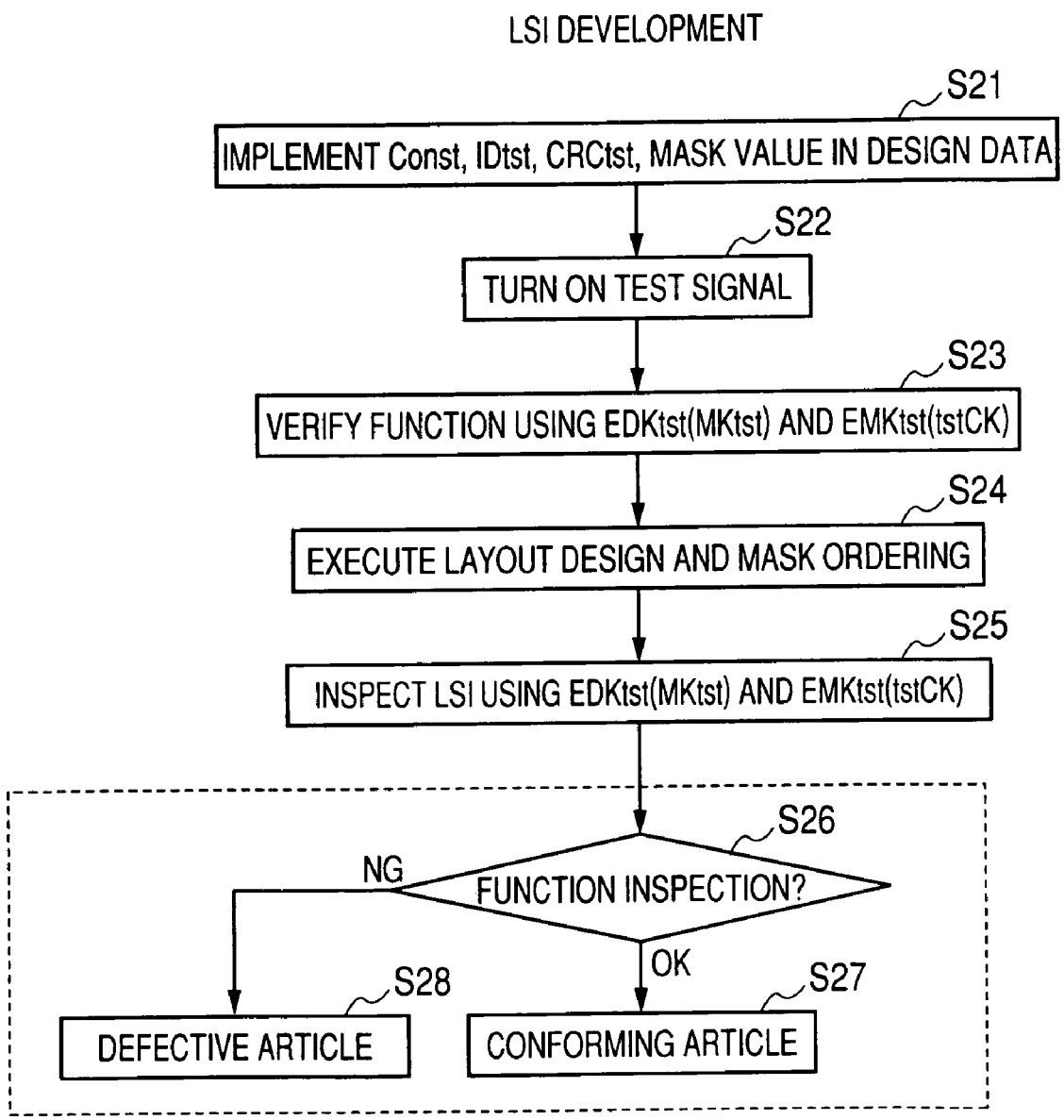
FIG. 2 is a flowchart to describe the developing process of a system LSI incorporated in the security information implementation system of the embodiment of the invention.
Figure 3:
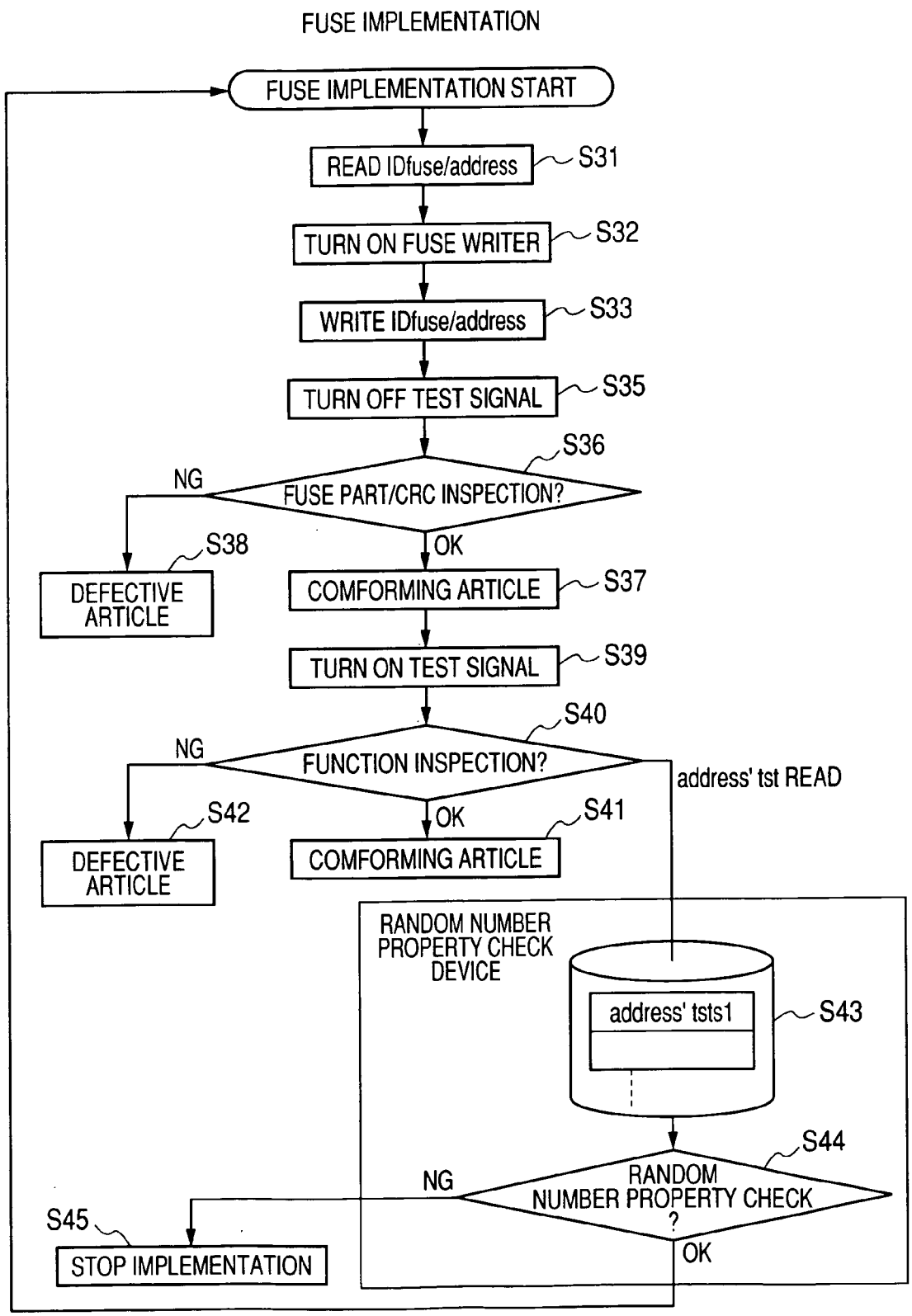
FIG. 3 is a flowchart to describe the fuse implementation process of the security information implementation system of the embodiment of the invention.
Figure 4:
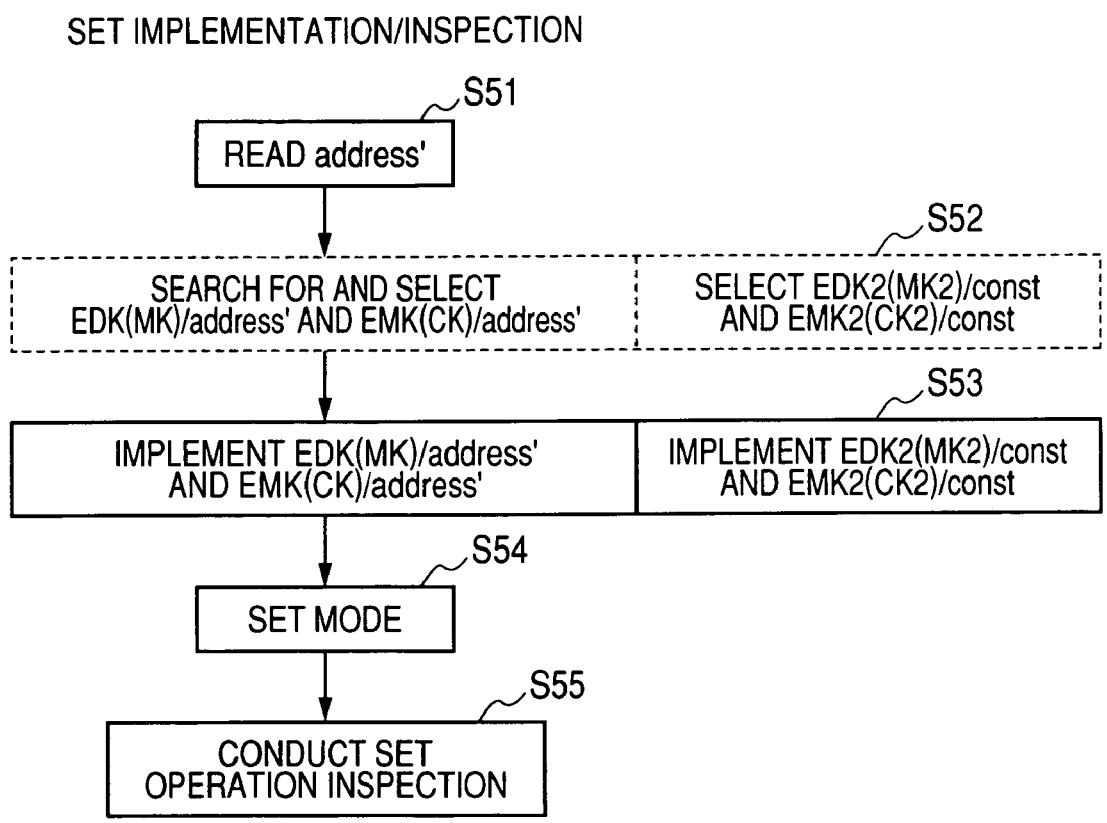
FIG. 4 is a flowchart to describe the set implementation process in a terminal, etc., incorporating the security information implementation system of the embodiment of the invention.

FIG. 1 is a flowchart to describe all processes until implementation of the security information implementation system of the embodiment in a terminal. FIGS. 2, 3, and 4 are flowcharts to describe the developing process of a system LSI incorporated in the security information implementation system of the embodiment, the fuse implementation process, and the set implementation process in a terminal, etc.

Figure 5:
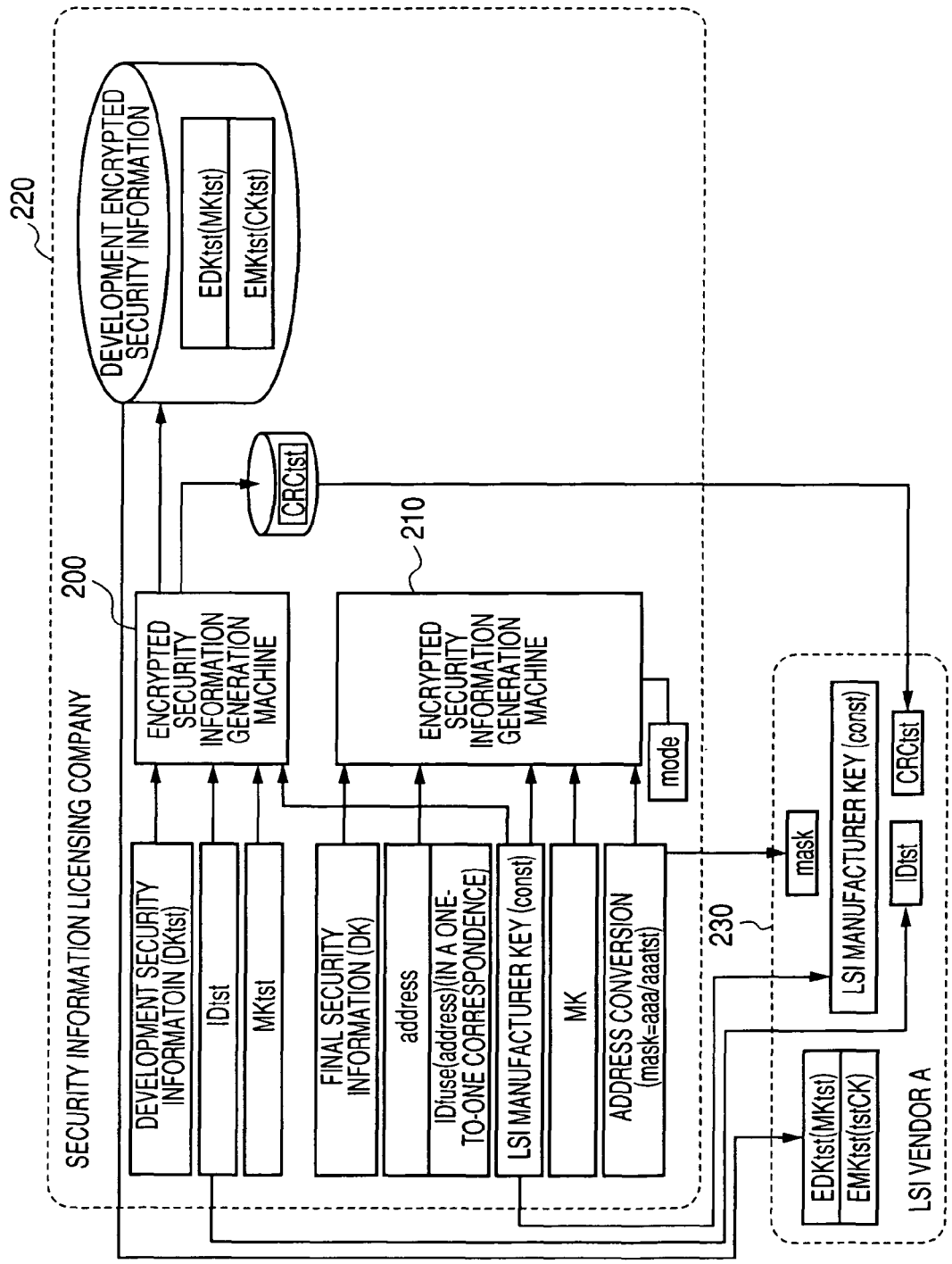
FIG. 5 is a drawing to describe a license scheme for a security information licensing company 220 to issue a license to an LSI vendor A 230 taking charge of developing and manufacturing the system LSI.

FIG. 5 is a drawing to describe a license scheme for a security information licensing company 220 to issue a license to an LSI vendor A 230 taking charge of developing and manufacturing the system LSI at the developing process of the system LSI incorporated in the security information implementation system of the embodiment.

Figure 6:
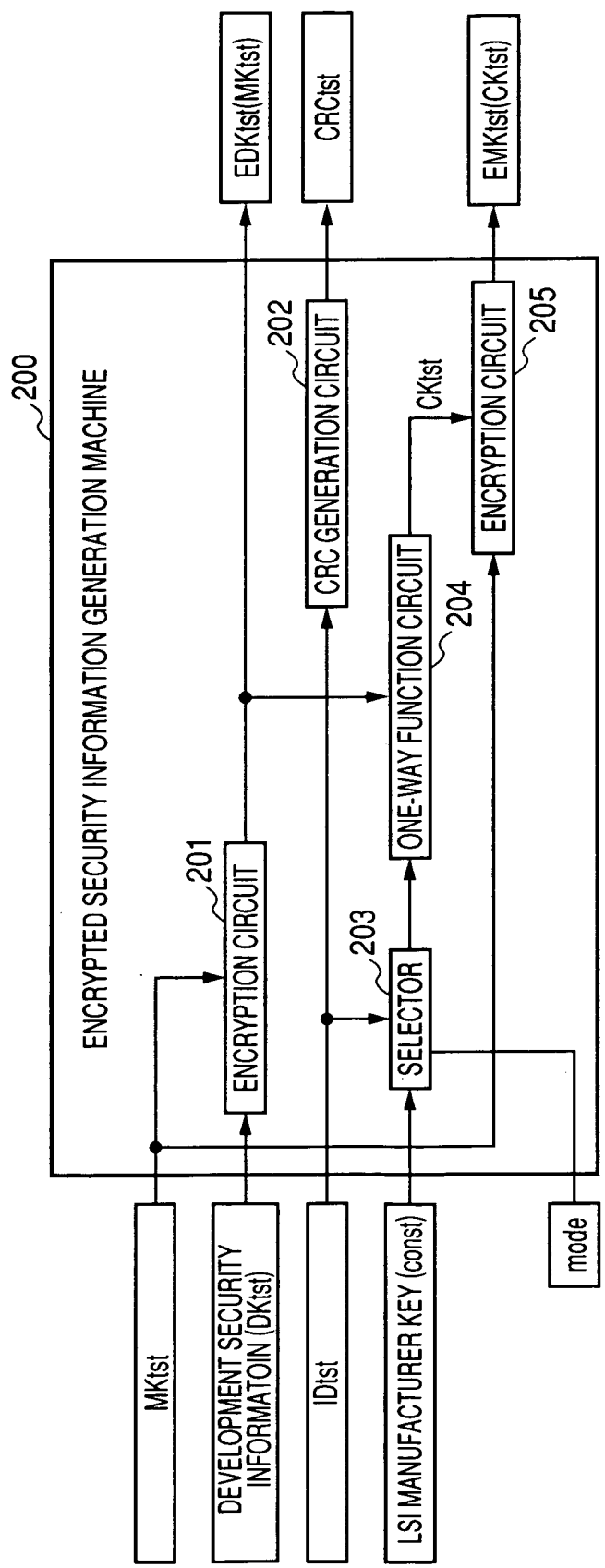
FIG. 6 is a block diagram to describe an encrypted security information generation machine 200 for generating encrypted security information.
Figure 7:
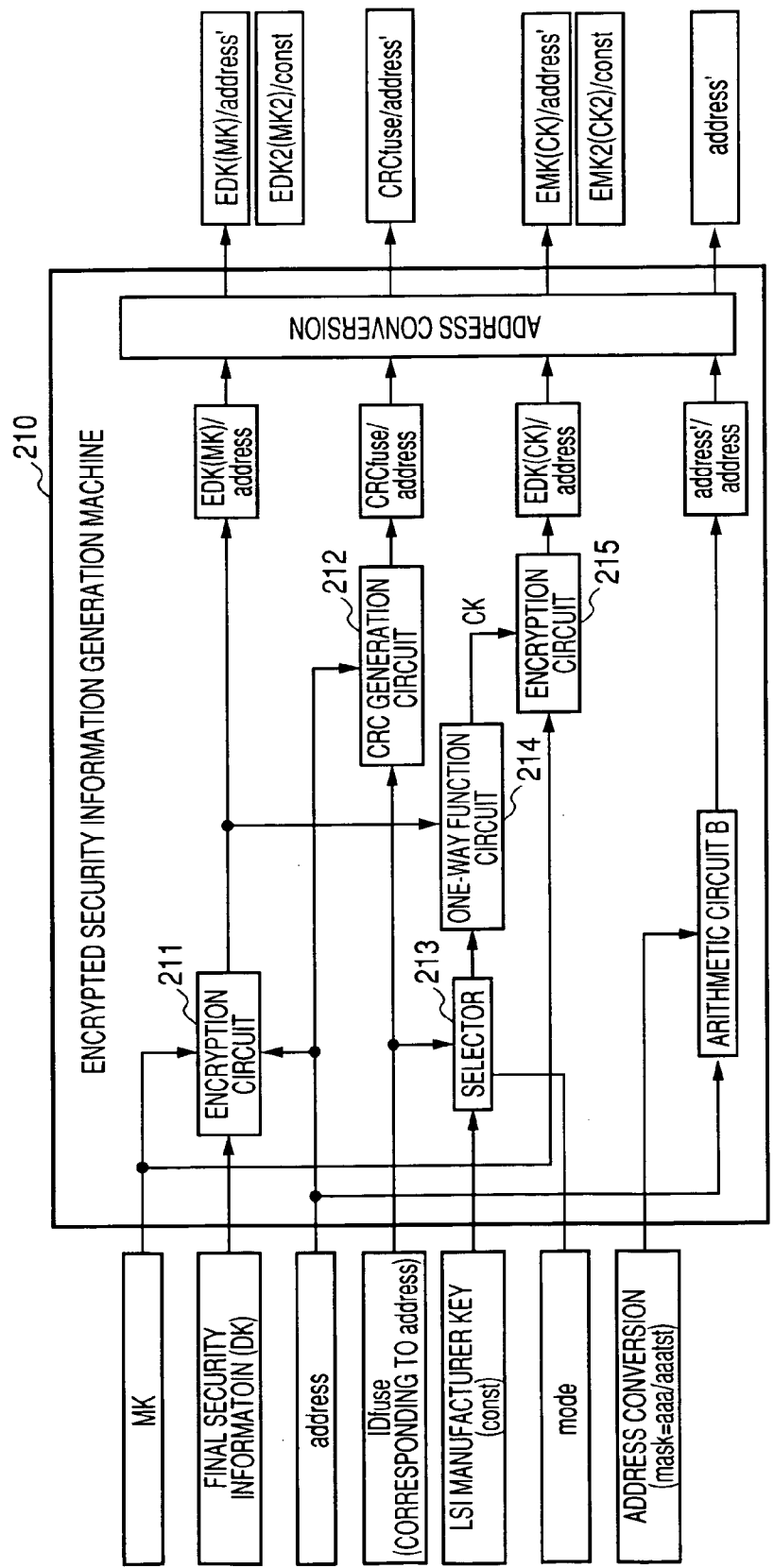
FIG. 7 is a block diagram to describe an encrypted security information generation machine 210 for generating encrypted security information.

FIGS. 6 and 7 are block diagrams to describe encrypted security information generation machines 200 and 210 for generating encrypted security information in the security information licensing company 220 shown in FIG. 5.

Figure 8:
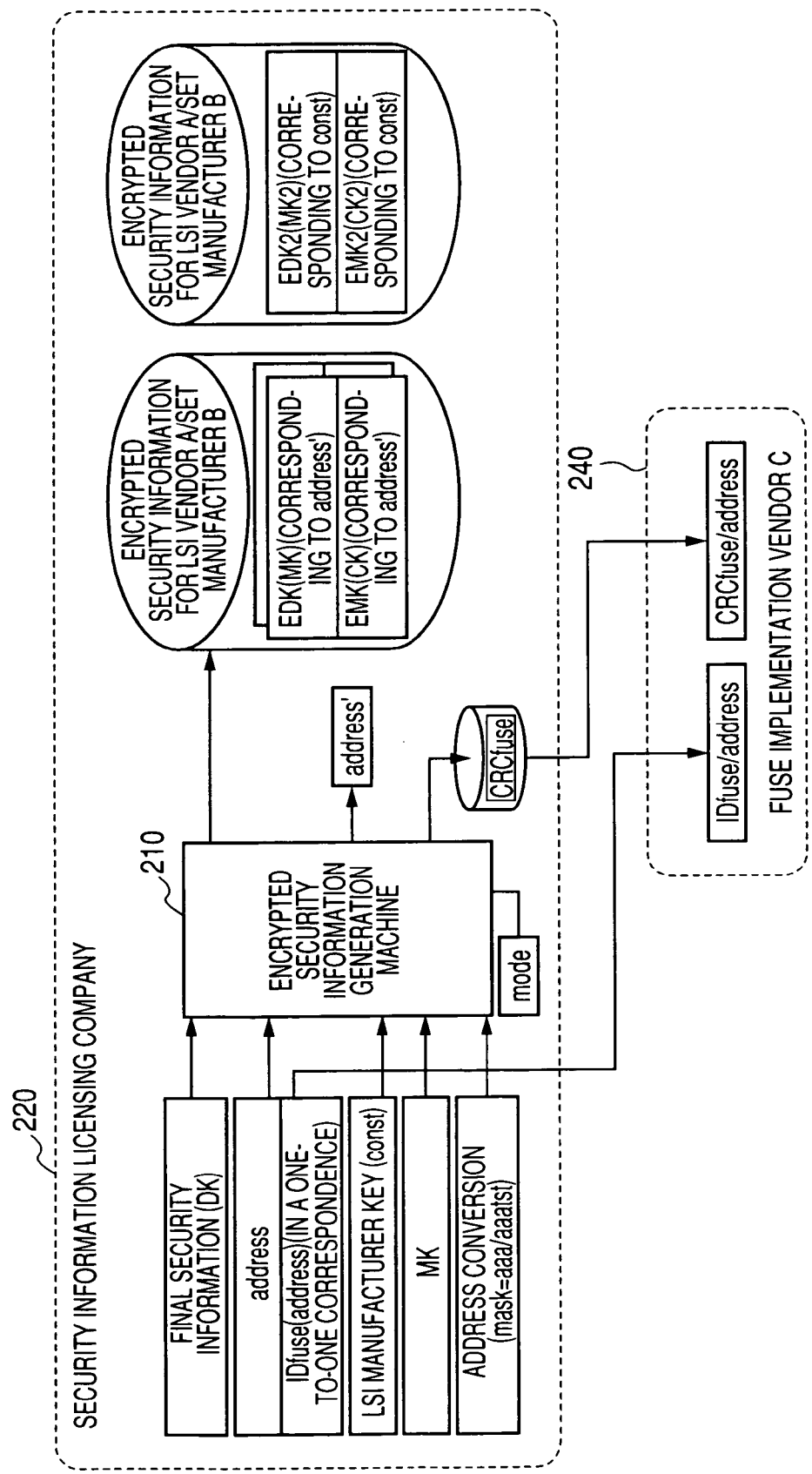
FIG. 8 is a drawing to describe a license scheme for the security information licensing company 220 to issue a license to a fuse implementation vendor C 240 taking charge of fuse implementation of the system LSI.

FIG. 8 is a drawing to describe a license scheme for the security information licensing company 220 to issue a license to a fuse implementation vendor C 240 taking charge of fuse implementation of the system LSI at the fuse implementation process of the system LSI incorporated in the security information implementation system of the embodiment.

Figure 9:
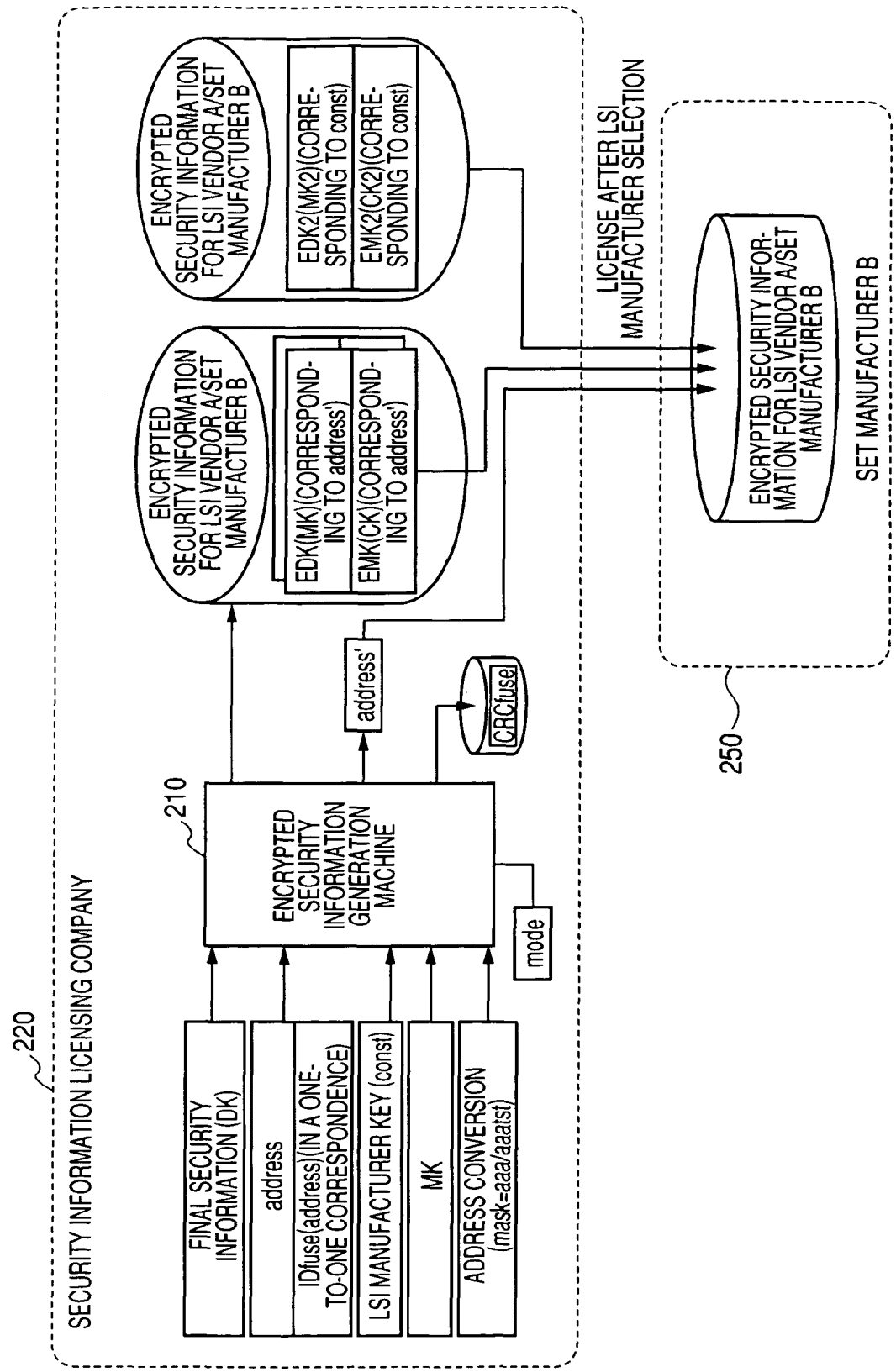
FIG. 9 is a drawing to describe a license scheme for the security information licensing company 220 to issue a license to a set maker B 250 taking charge of set implementation of the system LSI.
Figure 10:
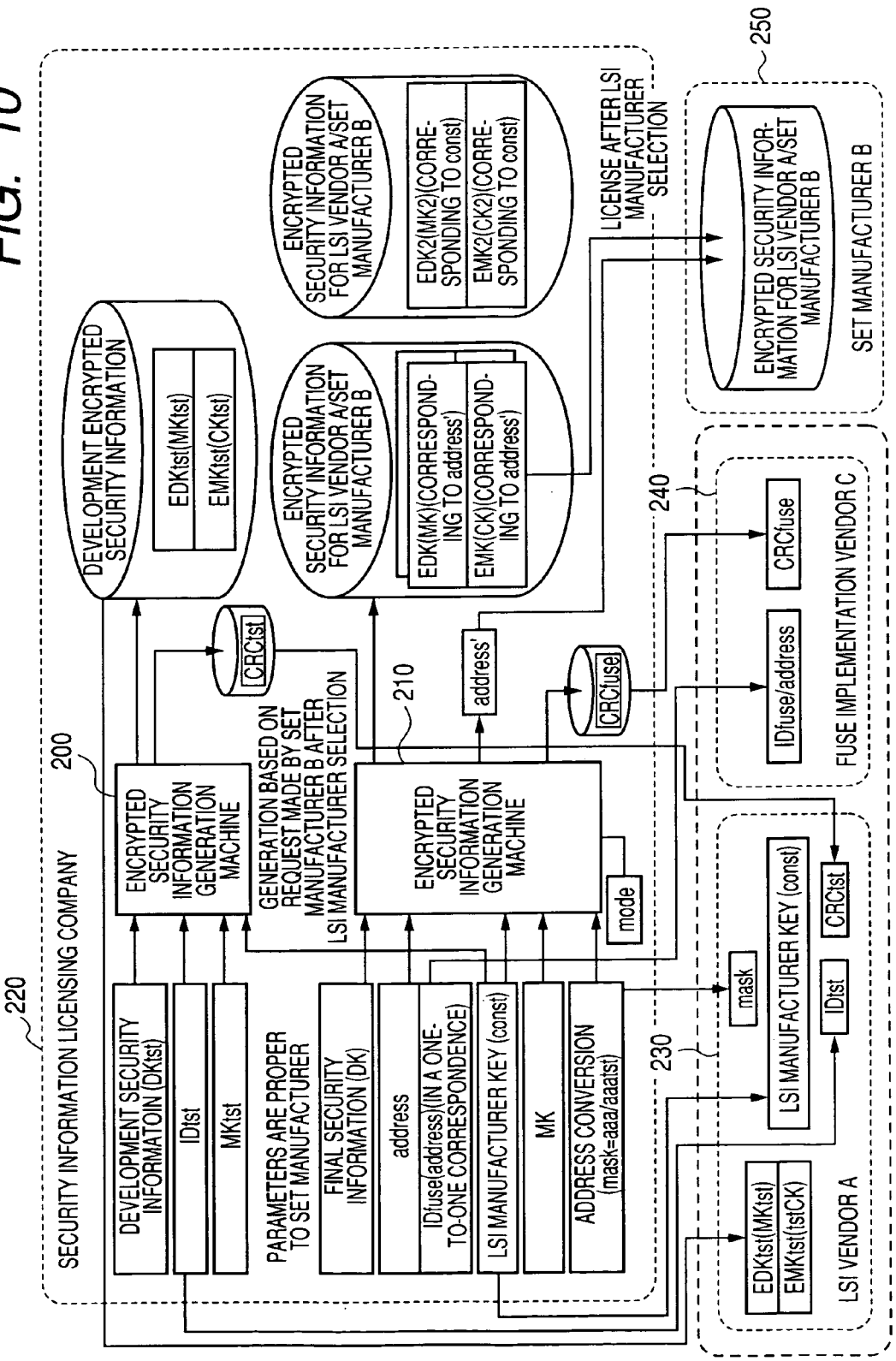
FIG. 10 is a drawing to describe a license scheme of all processes for implementing the security information implementation system of the embodiment of the invention.

FIG. 9 is a drawing to describe a license scheme for the security information licensing company 220 to issue a license to a set manufacturer B 250 taking charge of set implementation of the system LSI at the set implementation process of the system LSI incorporated in the security information implementation system of the embodiment. FIG. 10 is a drawing to describe a license scheme of all processes for implementing the security information implementation system of the embodiment in a terminal as integration of FIGS. 5, 8, and 9.

The license schemes at the stages of developing, manufacturing, inspecting, and implementing the security information implementation system of the embodiment of the invention will be discussed in order. The main body for selling a terminal incorporating the security information implementation system of the embodiment and managing the copyright of content played back, etc., with the terminal is the security information licensing company 220.

First, the security information licensing company 220 generates encrypted security information for LSI development to issue an LSI development license to the LSI vendor A230 (step S11 in FIG. 1), as shown in FIGS. 1 and 5. The security information licensing company 220 generates the encrypted security information to be provided for the LSI vendor A 230 by the encrypted security information generation machine 200, as shown in FIG. 6. That is, an encryption circuit 201 encrypts development security information DKtst using test internal security information MKtst as a key to generate first development encrypted information EDKtst (MKtst).

Next, a selector 203 outputs a selected test constant IDtst according to a first mode setup value (mode). Here, to inspect the value of an LSI manufacturer key, i.e., "const", the first mode setup value may be set so that the selector 203 outputs the LSI manufacturer key const. Further, a one-way function circuit 204 converts the conversion result by a one-way function using the first development encrypted information EDKtst (MKtst) generated by the encryption circuit 201 as a key to generate a test conversion key CKtst. The first mode setup value is implemented with a fuse in a state in which change in the first mode setup value after being implemented is prohibited, whereby tampering with the security information can be prevented.

Then, an encryption circuit 205 encrypts the test internal security information MKtst using the test conversion key CKtst output from the one-way function circuit 204 as a key to generate second development encrypted information EMKtst (CKtst). A CRC generation circuit 202 performs redundancy operation (for example, CRC 16) on the test constant IDtst to generate a verification test constant CRCtst.

The security information licensing company 220 provides the LSI vendor A 230 with the first and second development encrypted security information EDKtst (MKtst) and EMKtst (CKtst), the test constant IDtst, the verification test constant CRCtst, and the LSI manufacturer key const, as shown in FIG. 5.

Next, the LSI vendor A 230 provided with the development encrypted security information develops and manufacture an LSI based on the development encrypted security information (step S14 in FIG. 1).

FIG. 2 is a flowchart of the LSI developing and manufacturing processes conducted by the LSI vendor A 230. In the LSI vendor A 230, the LSI manufacturer key const, the test constant IDtst, the verification test constant CRCtst, and address conversion (mask) value are implemented in the design data (step S21) and a TEST signal for LSI inspection described later is turned on (step S22), as shown in FIG. 2.

The LSI function is verified using the first and second development encrypted security information EDKtst (MKtst) and EMKtst (CKtst) (step S23) and layout design and mask ordering are executed (step S24).

Here, the LSI function may be verified using the first and second development encrypted security information EDKtst (MKtst) and EMKtst (CKtst) generated according to the LSI manufacturer key const with the inspection TEST signal turned off as mentioned above.

Next, LSI inspection is conducted using the first and second development encrypted security information EDKtst (MKtst) and EMKtst (CKtst) (step S25). If function inspection (step S26) is OK, the LSI is classified into a conforming article (step S27); if function inspection is NG, the LSI is classified into a defective article (step S28).

Next, the security information licensing company 220 generates encrypted security information of IDfuse, etc., provided for the fuse implementation vendor C 240 (step S12 in FIG. 1) and also generates encrypted security information of first encrypted security information EDK (MK)/address, etc., provided for the set manufacturer B 250 (step S13 in FIG. 1).

In this case, the security information licensing company 220 generates the encrypted security information by the encrypted security information generation machine 210, as shown in FIGS. 7 and 8. That is, an encryption circuit 211 encrypts final security information DK using internal security information MK corresponding to the address (i.e., "address") as a key to generate first encrypted security information EDK (MK)/address associated with the address.

Next, a selector 213 outputs a constant IDfuse/address corresponding to the selected address according to the first mode setup value (mode). Further, a one-way function circuit 214 converts the result by a one-way function using the first encrypted security information EDK (MK)/address generated by the encryption circuit 211 as a key to generate a conversion key CK.

Then, the internal security information MK is encrypted using the conversion security information CK and address generated by the one-way function circuit 214 as a key to generate second encrypted security information EMK (CK)/address. A CRC generation circuit 212 performs redundancy operation (for example, CRC 16) on the constant IDfuse/address corresponding to the address to generate a verification constant CRCfuse/address corresponding to the address. Further, the encrypted security information generation machine 210 executes address conversion (mask) of the first encrypted security information EDK (MK)/address, the second encrypted security information EMK (CK)/address, and the verification constant CRCfuse/address to a conversion address, i.e., "address'," and outputs the conversion address "address'" and generates the first encrypted security information EDK (MK)/address', the second encrypted security information EMK (CK)/address', and the verification constant CRCfuse/address' associated with address' corresponding to the address. Further, the information pieces are sorted in the numeric order of address'.

Further, the encrypted security information generation machine 210 switches so that the selector 213 selects the LSI manufacturer key const according to the first mode setup value (mode) and performs processing similar to that described above to generate third encrypted security information EDK2 (MK2)/const and fourth encrypted security information EMK2 (CK2)/const.

The security information licensing company 220 provides the fuse implementation vendor C 240 with the constant IDfuse/address and the verification constant CRCfuse/address, as shown in FIG. 8. The fuse implementation vendor C 240 provided with the implementation encrypted security information executes LSI inspection and fuse implementation based on the implementation encrypted security information (step S15 in FIG. 1).

FIG. 3 is a flowchart of the fuse implementation process executed by the fuse implementation vendor C 240. The fuse implementation vendor C 240 reads the constant IDfuse/address provided by the security information licensing company 220 (step S31) and turns on a fuse writer (step S32).

The constant IDfuse/address is written into the LSI (step S33), the TEST signal is turned off (step S35), and fuse part and CRC inspection is executed (step S36).

If the constant IDfuse/address is normally written as a result of the CRC inspection (OK), the LSI is classified into a conforming article (step S37); if the constant IDfuse/address is not normally written (NG), the LSI is classified into a defective article (step S38).

Next, the TEST signal is turned on for the conforming article (step S39) and function inspection of the decryption circuit, the one-way function circuit, etc., provided in the LSI is conducted (step S40). If the function inspection is normal (OK), the LSI is classified into a conforming article (step S41); if the function inspection is not normal (NG), the LSI is classified into a defective article (step S42). address' tst is read and whether or not random number property and inherence are maintained in each implemented address' tst is checked in a random number property check unit (step S44) in parallel at the function inspection stage. When random number property and inherence are abnormal in each implemented address' tst as the check result (if the same value is read, etc.,), it is determined that the fuse implementation process is abnormal, and the implementation is stopped (step S45).

The LSI classified into a conforming article as the function inspection is normal in the fuse implementation vendor C 240 is shipped to the set manufacturer B 250 (step S16 in FIG. 1) and set development is conducted in the set manufacturer B 250 (step S17).

On the other hand, in the security information licensing company 220, the first encrypted security information EDK (MK)/address', the second encrypted security information EMK (CK)/address', the third encrypted security information EDK2 (MK2)/const, and the fourth encrypted security information EMK2 (CK2)/const sorted according to address' are generated by the encrypted security information generation machine 210 as described above, and are provided for the set manufacturer B 250 (see FIG. 9).

In the set manufacturer B 250 provided with the encrypted security information, the LSI is implemented in a set (step S18 in FIG. 1). The LSI implementation process in the set manufacturer B 250 is shown in the flowchart of FIG. 4.

That is, in the set manufacturer B 250, the address having the correlation with the encrypted security information (Address') is read (step S51) and the database of the encrypted security information provided by the security information licensing company 220 is searched for the first encrypted security information EDK (MK)/address' and the second encrypted security information EMK (CK)/address' in accordance with the Address' value for selection. At the same time, the third encrypted security information EDK2 (MK2)/const and the fourth encrypted security information EMK2 (CK2)/const are selected as required (step S52).

The first encrypted security information EDK (MK)/address', the second encrypted security information EMK (CK)/address', the third encrypted security information EDK2 (MK2)/const, and the fourth encrypted security information EMK2 (CK2)/const which are selected are implemented in a set (step S53), inputting the first encrypted security information EDK (MK)/address' and the second encrypted security information EMK (CK)/address' or the third encrypted security information EDK2 (MK2)/const and the fourth encrypted security information EMK2 (CK2)/const is switched depending on which of IDfuse and const is to be used according to a mode flag of the first mode setup value in the LSI (step S54), and final operation inspection of the set is conducted (step S55). The mode flag may be fixed by fuse blowing or terminal fixing.

The set manufacturer makes it impossible to read address' tst by fixing the test signal, whereby it is made impossible to identify the LSI from the information possessed by the fuse implementation vendor C 240, so that the information can be furthermore protected.

The internal security information MK and the final security information DK have each the composition of (YYYY)+(set manufacturer identification bits), for example, and have bits for making it possible to identify the set manufacturer implementing the LSI in the set. However, the internal security information MK and the final security information DK may be different values for each IDfuse. Thus, the constant IDfuse/address is the ID unique to the LSI associated with the address and therefore the set manufacturer cannot divert the same security information. Since the internal security information MK and the final security information DK contain the bits for making it possible to identify the set manufacturer implementing the LSI, if the internal security information MK and the final security information DK leak, management of the information can be enhanced.

EXAMPLE 1

Next, the circuitry and the operation of the security information implementation system of the embodiment will be discussed for each process stage.

Figure 11:
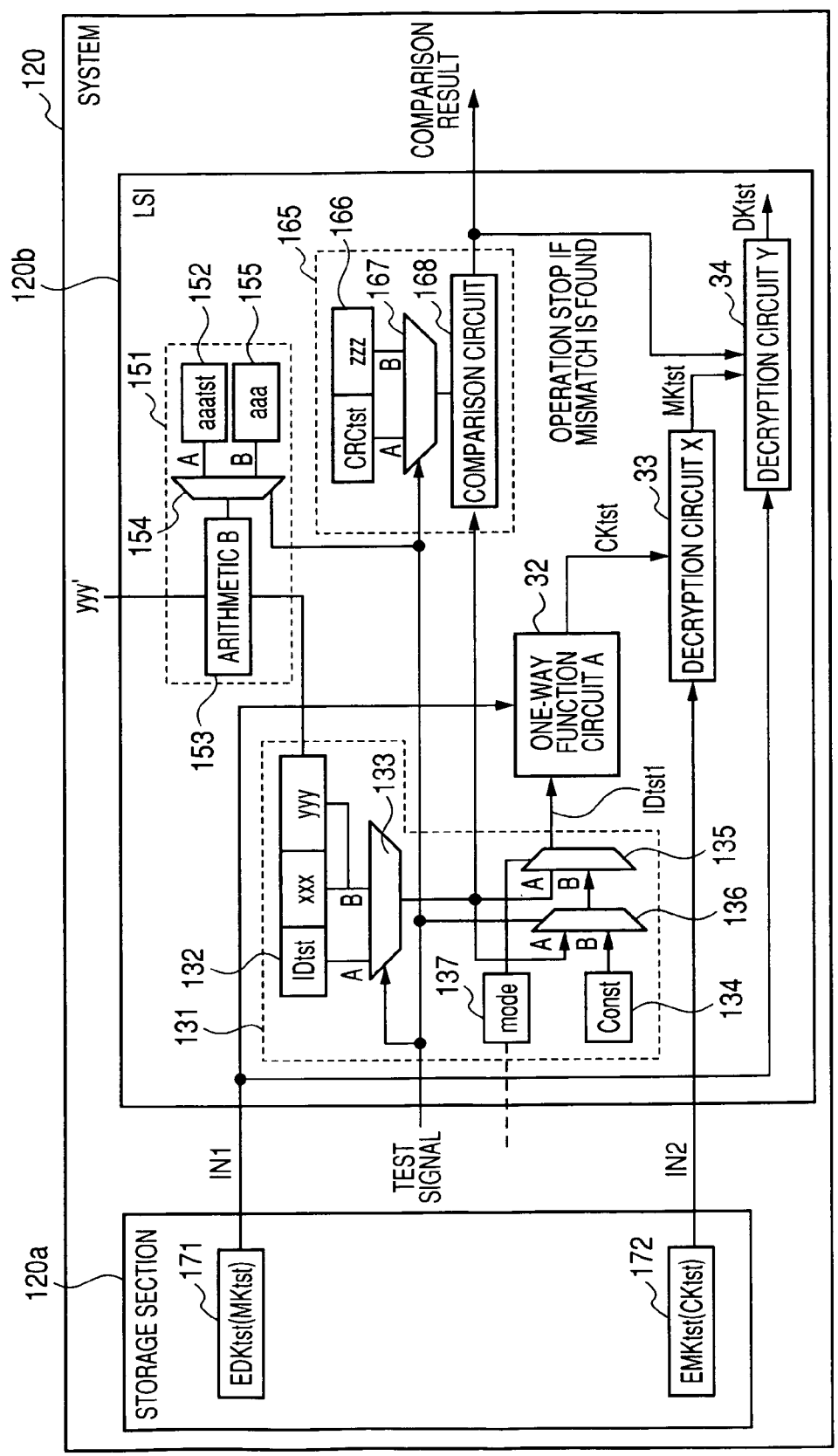
FIG. 11 is a circuit diagram to describe the schematic configuration of security information implementation system 120 of the embodiment of the invention at the LSI development stage.

FIG. 11 is a circuit diagram to describe the schematic configuration of security information implementation system 120 of the embodiment at the LSI development stage. Since data is not written into a fuse or an address described later at the stage of developing an LSI in the LSI vendor A 230, inspection is conducted using a test value. As shown in FIG. 11, the security information implementation system 120 includes a storage section 120*a* and an LSI 120*b*.

The storage section 120*a* stores first test encrypted security information EDKtst (MKtst) provided by encrypting test final security information DKtst using test internal security information MKtst and second test encrypted security information EMKtst (CKtst) provided by encrypting the test internal security information MKtst using test conversion security information CKtst provided by conversion by a one-way function. The test conversion security information CKtst is provided by conversion by a one-way function equivalent to that used to generate conversion security information CK. The LSI 120*b* is provided with a seed generation section 131 including a first constant storage section 132, a first selector 133, a second constant storage section 134, a first mode setup value, and a second selector 135.

The first constant storage section 132 stores a second constant IDtst on which a test conversion seed IDtst1 is based. The first constant storage section 132 contains an area where a first constant IDfuse on which a conversion seed IDfuse1 is based and an address are written at the fuse implementation stage after completion of the LSI development. Since the data in the area is not used at the LSI development stage, "xxx," "yyy" is described as the first constant in the figure, but any value may be set if it is a value not used as a commodity. The first constant storage section 132 is configured so that the second constant IDtst, the first constant IDfuse, and the address can be implemented by fuse blowing or writing constants from the outside by an electric fuse or any other non-volatile device, etc., such as laser trimming.

The second selector 133 selectively outputs either of the first and second constants "xxx," "yyy" and IDtst in response to a test signal TEST. The second constant storage section 134 stores a third constant Const, which becomes an LSI manufacturer key. A third selector 136 selectively outputs either of a third constant Const and the second constant IDtst in response to the test signal TEST. Further, the second selector 133 selects one of the two values selected by the first selector 133 and the third selector 136 according to the first mode setup value and outputs a conversion seed.

The LSI 120*b* includes a first one-way function circuit A 32 for converting the output of the second selector 135 as the conversion seed by a one-way function using first input IN1, namely, first test encrypted security information EDKtst (MKtst) to generate test conversion security information CKtst, a first decryption circuit X 33 for decrypting second input IN2, namely, second test encrypted security information EMKtst (CKtst) using the output of the first one-way function circuit A 32 as a key, and a second decryption circuit Y 34 for decrypting the first input IN1 using the output of the first decryption circuit X 33 as a key.

Further, the LSI 120*b* is provided with a verification circuit 165 for verifying the output of the first selector 133. The verification circuit 165 includes a third constant storage section 166 storing a constant CRCtst corresponding to the result of redundancy operation on the test constant IDtst and a comparison circuit 168 for performing the above-mentioned redundancy operation on the output of the first selector 133 and making a comparison between the operation result and the constant CRCtst stored in the third constant storage section 166.

Further, in the LSI 120*b*, the address in the first constant is input to an arithmetic circuit B 153. A fourth selector 154 selectively outputs a sixth constant aaa indicated by 155 or a seventh constant aaatst indicated by 152 in response to the test signal TEST. The selective output is also input to the arithmetic circuit B 153 and the address input to the arithmetic circuit B 153 is converted by a conversion circuit 151 for output.

Figure 14:
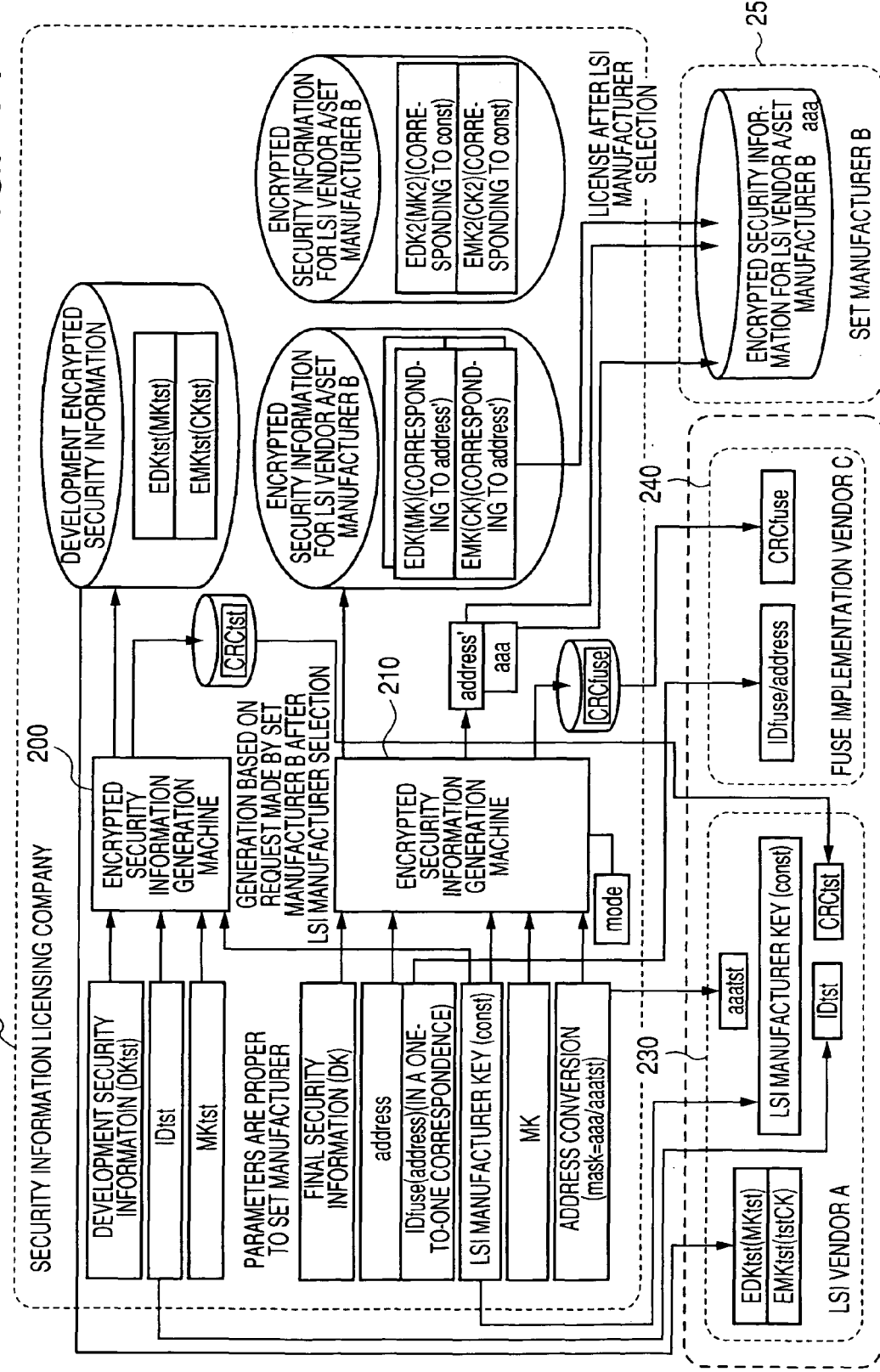
FIG. 14 is a drawing to describe a license scheme of all processes for implementing the security information implementation system in a terminal when a sixth constant aaa for generating conversion address information 1 of the embodiment of the invention is set from the outside.
Figure 15:
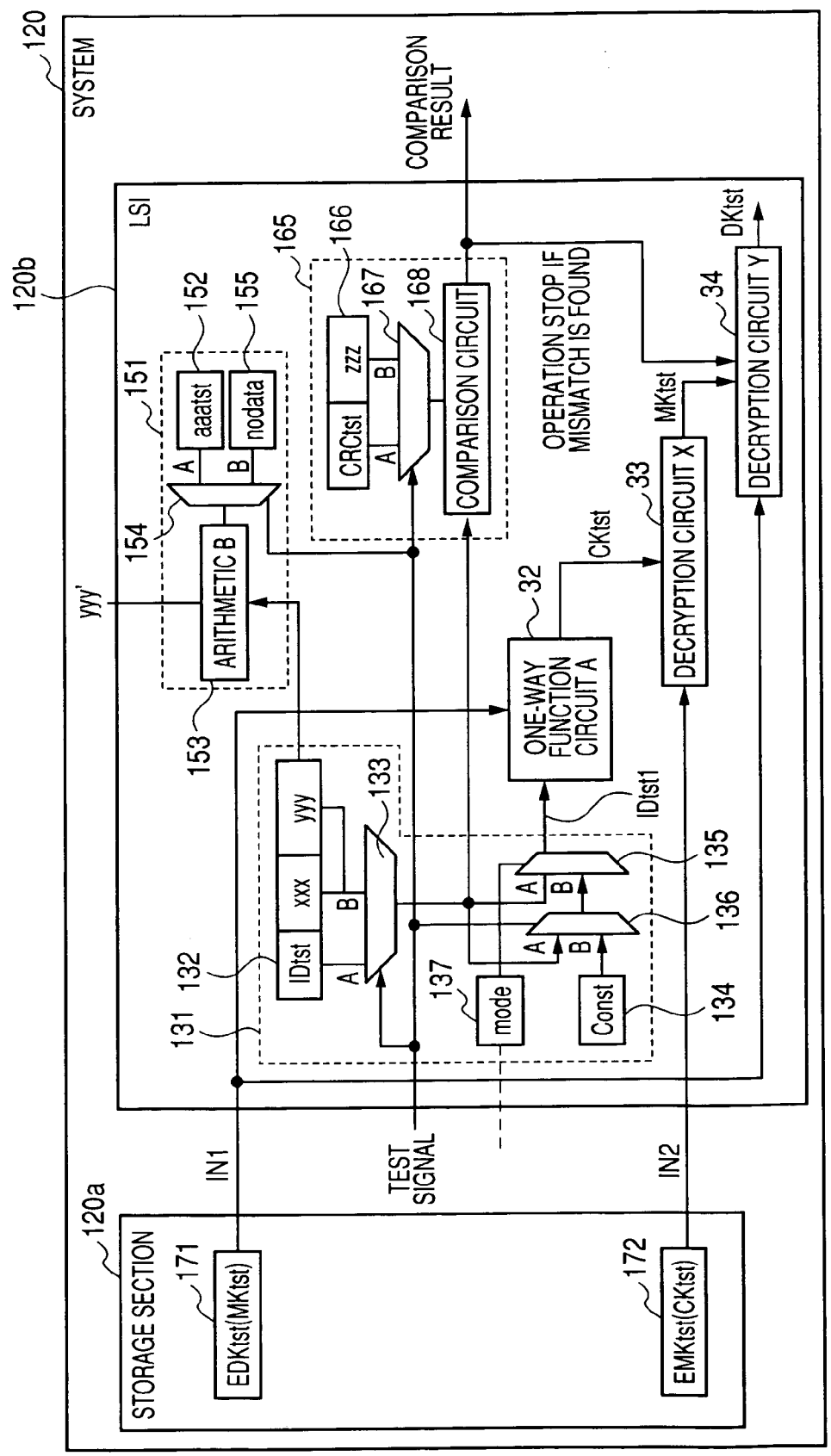
FIG. 15 is a circuit diagram to describe the schematic configuration of the security information implementation system 120 at the LSI development stage when the sixth constant aaa for generating the conversion address information 1 of the embodiment of the invention is set from the outside.

The sixth constant aaa can also be input from the outside and set. In this case, the sixth constant aaa is not passed to the LSI vendor A 230 and is provided for the set manufacturer B 250, as shown in FIG. 14. No data is written and any desired initial value (nodata) is entered at the LSI implementation stage as shown in the conversion circuit 151 in FIG. 15.

At the LSI development time, the first constant IDfuse and the address used at the fuse implementation stage or the constant writing stage from the outside are not written into the first constant storage section 132 and accordingly, the data corresponding to the first constant IDfuse and the address is not written into the third constant storage section 166 either and thus zzz is shown in the figure. Like xxx, yyy, zzz may be any value if it is a value not used as a commodity. The first constant, the second constant, the third constant, the fourth constant corresponding to the result of the redundancy operation on the first constant, the fifth constant corresponding to the result of the redundancy operation on the second constant, the sixth constant, and the seventh constant are inhibited from being read out to the outside of the LSI for improving the concealment of the security information. Since the fourth constant and the fifth constant are output and are verified, the first and second constants can be verified for validity at the implementation stage.

Next, the operation at the inspection time of the LSI 120b will be discussed. In this case, the test signal TEST is set to "1." At this time, the first selector 133 receives "1" as the test signal TEST and selects and outputs the second test constant IDtst stored in the first constant storage section 132.

Likewise, the second selector 135 also receives "1" as the test signal TEST and selects IDtst stored in the first constant storage section 132. That is, IDtst is output as the conversion seed from the seed generation section 131 regardless of the first mode setup value.

The first one-way function circuit A 32 converts test conversion seed IDtst1 output from the seed generation section 131 by a one-way function corresponding to the function used to generate the test conversion security information CKtst using the first input IN1, namely, the first test encrypted security information EDKtst (MKtst). Accordingly, the one-way function circuit A 32 generates and outputs the test conversion security information CKtst.

The first decryption circuit X 33 decrypts the second input IN2, namely, the second encrypted security information EMKtst (CKtst) using the output of the first one-way function circuit A 32, namely, the test conversion security information CKtst as a key. Accordingly, the first decryption circuit X 33 generates and outputs test internal security information MKtst.

The second decryption circuit Y 34 decrypts the first input IN1, namely, the first test encrypted security information EDKtst (MKtst) using the output of the first decryption circuit X 33, namely, the test internal security information MKtst as a key. Accordingly, the second decryption circuit Y 34 generates test final security information DKtst.

On the other hand, a fifth selector 167 in the verification circuit 165 receives "1" as the test signal TEST and selects and outputs the test verification constant CRCtst stored in the third constant storage section 166.

At this time, the output of the first selector 133 is also input to the comparison circuit 168 in the verification circuit 165. The comparison circuit 168 checks whether or not the result of the redundancy operation on the output of the first selector 133 and CRCtst stored in the third constant storage section 166, output by the fifth selector 167 are the same. If the comparison circuit 168 detects a mismatch, the operation of the second decryption circuit Y 34 is stopped. Accordingly, the validity of the second test constant IDtst stored in the seed generation section 131 can be verified. Dummy parameters at the LSI development stage are used for inspection, whereby the LSI developer cannot acquire the encrypted security information (parameters), so that the concealment of the encrypted security information can be improved. Further, the authorized product does not operate using the test value and therefore if the encrypted security information leaks illegally, the copyright on the content can be secured. At the usual operation time of the LSI 120b, the test signal TEST is set to "0," but the usual operation is not performed at the LSI development stage and therefore will not be discussed.

At the LSI inspection stage, the test signal TEST may be set to "0," the first mode setup value may be set so as to select the third constant Const, and third encrypted security information EDKtst (MKtst)/const and fourth encrypted security information EMKtst (CKtst)/const may be used for inspection.

Figure 12:
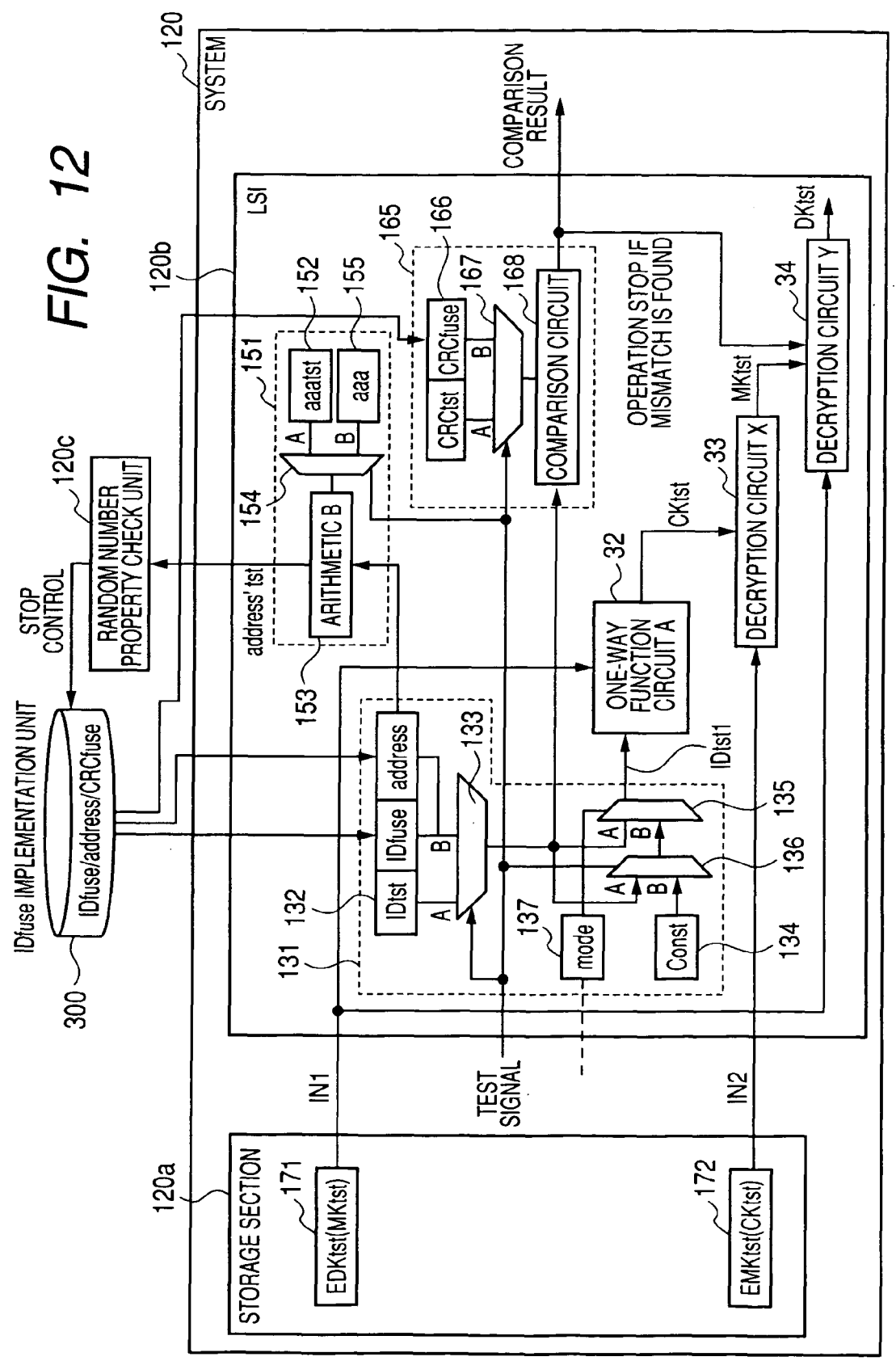
FIG. 12 is a circuit diagram to describe the schematic configuration of the security information implementation system 120 of the embodiment of the invention at the fuse implementation stage.

FIG. 12 is a circuit diagram to describe the schematic configuration of the security information implementation system 120 of the embodiment at the fuse implementation stage. At this stage, the fuse implementation vendor C 240 implements IDfuse of the security information licensed from the security information licensing company 220 in any LSIs separately. The function inspection at this stage is also conducted using test values with the test signal TEST set to "1" and the validity of fuse writing is checked by comparison inspection with the CRC value with the test signal TEST set to "0."

As shown in FIG. 12, fuse writing into the LSI 120b is executed from an IDfuse implementation unit 300 provided outside the security information implementation system 120. That is, IDfuse/address is written into the first constant storage section 132 of the seed generation section 131, and CRCfuse is written into the third constant storage section 166 of the verification circuit 165.

The validity of fuse writing is checked by setting the test signal TEST to "0." At this time, the first selector 133 receives "0" as the test signal TEST and selects and outputs the first constant IDfuse/address stored in the first constant storage section 132. The fifth selector 167 receives "0" as the test signal TEST and selects and outputs the verification constant CRCfuse/address stored in the third constant storage section 166.

The output of the first selector 133 is input to the comparison circuit 168 in the verification circuit 165. The comparison circuit 168 checks whether or not the result of the redundancy operation on the output of the first selector 133 and CRCfuse/address fuse-implemented in the third constant storage section 166 are the same. If the comparison circuit 168 detects a mismatch, the operation of the second decryption circuit Y 34 is stopped. Accordingly, the validity of the first constant IDfuse/address stored in the seed generation section 131 can be verified.

On the other hand, the function inspection of the LSI 120b is conducted using the second test constant IDtst and the test verification constant CRCtst with the test signal TEST set to "1" as at the LSI development stage shown in FIG. 11. At the same time, the address information in the first constant is input to the arithmetic circuit B 153 of the conversion circuit 151. Here, the address information is converted according to the seventh constant aaatst selected and output by the fourth selector 154 as the test signal TEST is set to "1," and conversion address information 2 address' tst (second conversion address information) is output to the outside of the LSI 120b. The output address' tst is input to a random number property check unit 120 C and the data is stored. When it is determined that random number property or inherence is not maintained in address' tst stored for each LSI, fuse implementation is canceled (see FIG. 3).

Figure 13:
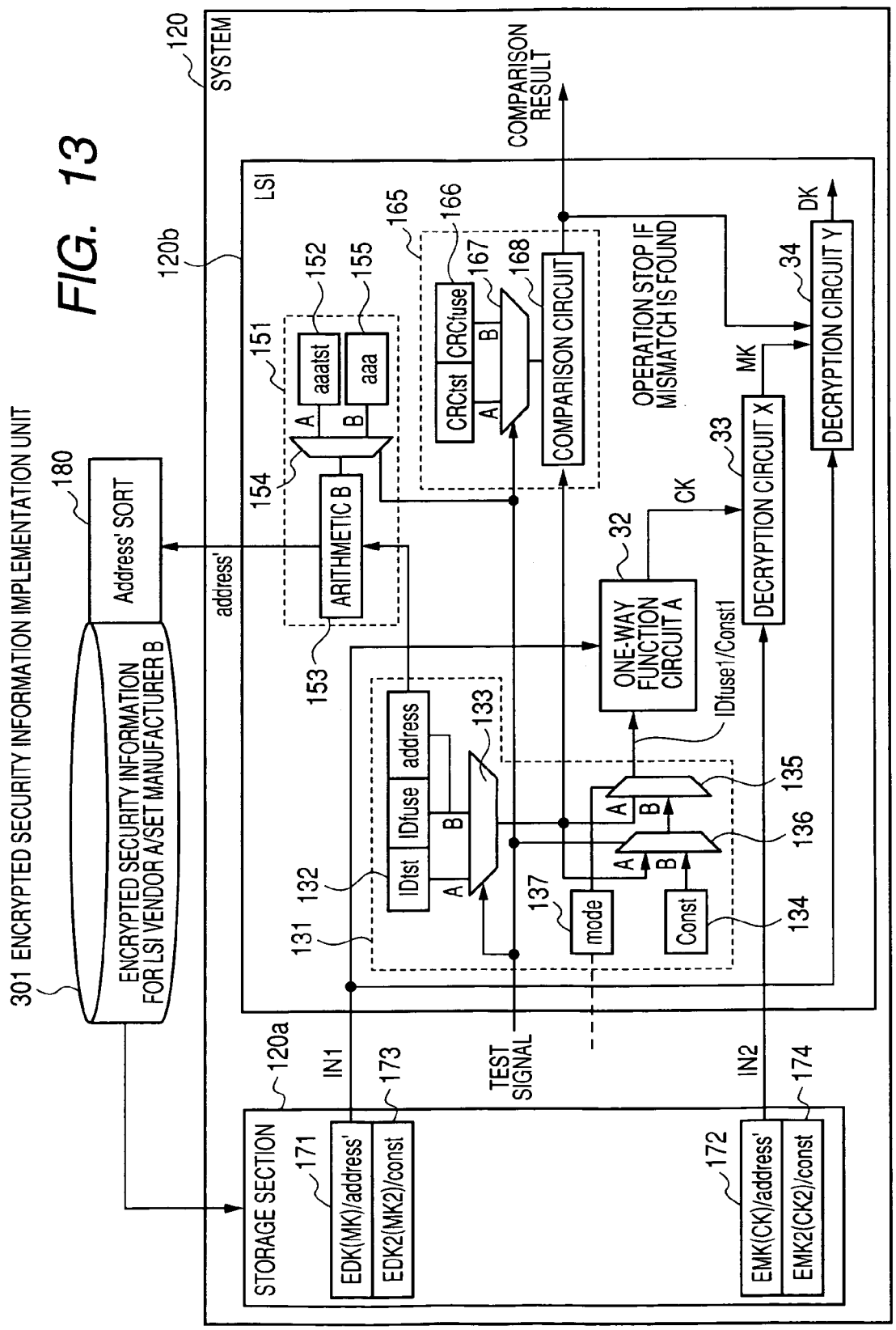
FIG. 13 is a circuit diagram to describe the schematic configuration of the security information implementation system 120 of the embodiment of the invention at the security information implementation stage in a set.

FIG. 13 is a circuit diagram to describe the schematic configuration of the security information implementation system 120 of the embodiment at the security information implementation stage in a set. In the set manufacturer B 250, the encrypted security information (parameters) licensed from the security information licensing company 220 is implemented in the storage section 120a based on conversion address information 1 address' (first conversion address information) output from the LSI 120b.

The test signal TEST is set to "0" at the security information implementation stage in a set. As shown in FIG. 13, an encrypted security information implementation unit 301 is provided outside the security information implementation system 120. On the other hand, in the LSI 120b, the address having the correlation with the first constant IDfuse in the first constant storage section 132 of the seed generation section 131 is converted into address' according to the sixth constant aaa selected and output by the fourth selector 154 as the test signal TEST is set to "0," and address' is output to the outside of the LSI 120b. The encrypted security information implementation unit 301 implements the encrypted security information (parameters) in the storage section 120a based on the output address'.

Figure 16:
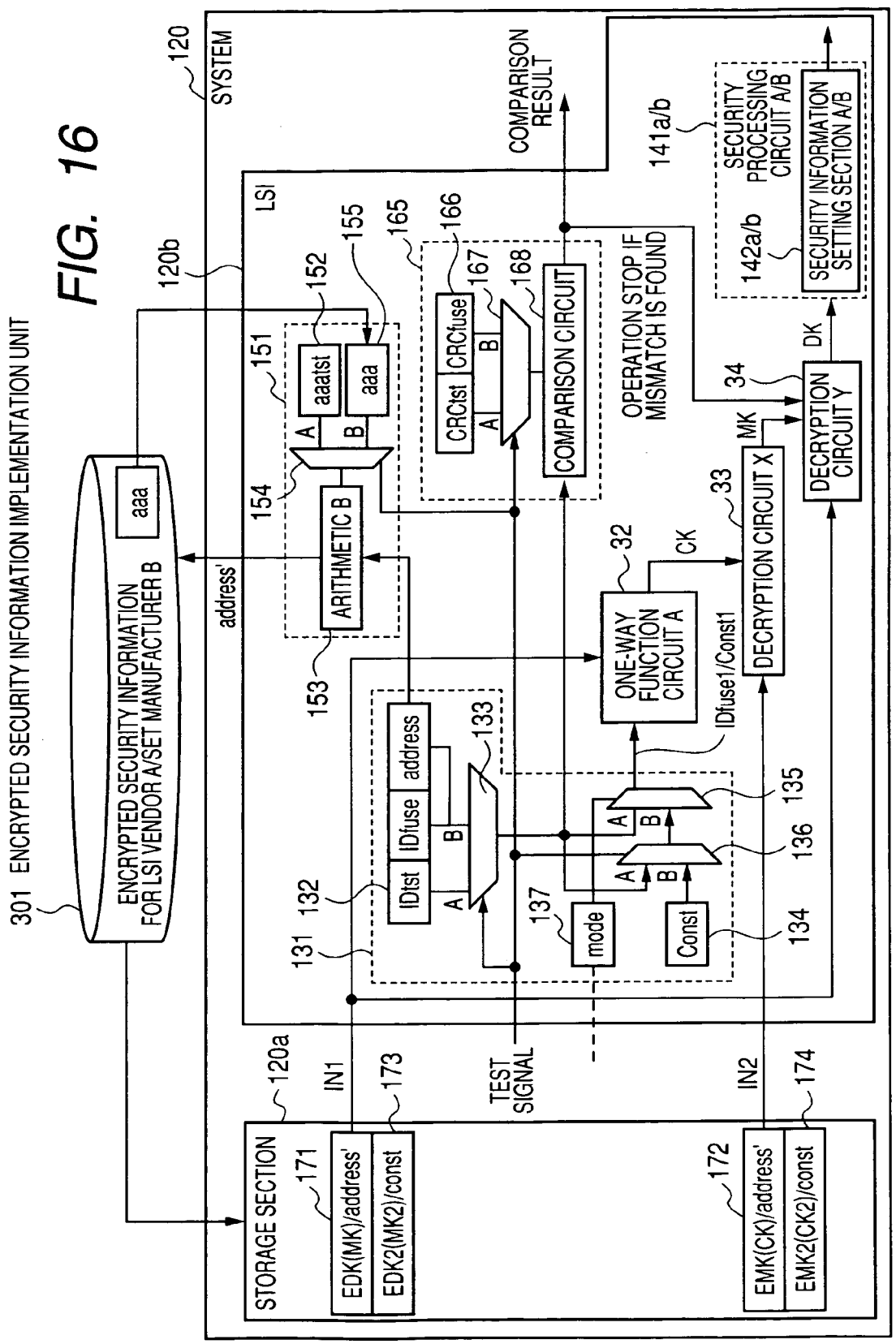
FIG. 16 is a circuit diagram to describe the schematic configuration of the security information implementation system 120 at the security information implementation stage in a set when the sixth constant aaa for generating the conversion address information 1 of the embodiment of the invention is set from the outside.

The sixth constant aaa can also be input from the outside and set. In this case, the sixth constant aaa is set in the conversion circuit 151 of the LSI 120b from the encrypted security information implementation unit 301, as shown in FIG. 16.

The encrypted security information implementation unit 301 reads the conversion address information 1 address' having the correlation with the first constant IDfuse from the conversion circuit 151, and writes the encrypted security information arranged in the specified conversion address information 1 address' order in a database in the encrypted security information implementation unit 301 into the storage section 120a of the security information implementation system 120. FIG. 13 shows a state in which the first encrypted security information EDK (MK)/address', the second encrypted security information EMK (CK)/address', the third encrypted security information EDK2 (MK2)/const, and the fourth encrypted security information EMK2 (CK2)/const are stored in the storage section 120a.

Next, the set operation is inspected (usual mode operation). At this time, the first selector 133 receives "0" as the test signal TEST and selects and outputs the first constant IDfuse/address stored in the first constant storage section 132.

To use the first encrypted security information EDK (MK)/address' and the second encrypted security information EMK (CK)/address', the first mode setup value is set to "1." Accordingly, the second selector 135 selects and outputs IDfuse output from the first selector 133, whereby the conversion seed IDfuse1 is output from the seed generation section 131.

The first one-way function circuit A 32 converts the conversion seed IDfuse1 output from the seed generation section 131 by a one-way function corresponding to the function used to generate the conversion security information CK using the first encrypted security information EDK (MK)/address'. Accordingly, the one-way function circuit A 32 generates and outputs the conversion security information CK.

The first decryption circuit X 33 decrypts the second encrypted security information EMK (CK)/address' using the output of the first one-way function circuit A 32, namely, the conversion security information CK as a key. Accordingly, the first decryption circuit X 33 generates and outputs internal security information MK. The second decryption circuit Y 34 decrypts the first input IN1, namely, the first test encrypted security information EDK (MK) using the output of the first decryption circuit X 33, namely, the internal security information MK as a key. Accordingly, the second decryption circuit Y 34 generates final security information DK.

Next, to use the third encrypted security information EDK2 (MK2)/Const and the fourth encrypted security information EMK2 (CK2)/Const, the first mode setup value is set to "0." Accordingly, the second selector 135 selects and outputs Const selected in response to "0" as the test signal TEST from the third selector 136, and conversion seed Const1 is output from the seed generation section 131.

The first one-way function circuit A 32 converts the conversion seed Const1 output from the seed generation section 131 by a one-way function corresponding to the function used to generate the conversion security information CK2 using the third encrypted security information EDK2 (MK2)/Const. Accordingly, the one-way function circuit A 32 generates and outputs the conversion security information CK2.

The first decryption circuit X 33 decrypts the fourth encrypted security information EMK2 (CK2)/Const using the output of the first one-way function circuit A 32, namely, the conversion security information CK2 as a key. Accordingly, the first decryption circuit X 33 generates and outputs internal security information MK2. The second decryption circuit Y 34 decrypts the first input IN1, namely, the third encrypted security information EDK2 (MK2)/Const using the output of the first decryption circuit X 33, namely, the internal security information MK2 as a key. Accordingly, the second decryption circuit Y 34 generates final security information DK2.

At this time, the fifth selector 167 receives "0" as the test signal TEST and selects and outputs the verification constant CRCfuse/address stored in the third constant storage section 166. The output of the fifth selector 167 is input to the comparison circuit 168. The output of the first selector 133 is also input to the comparison circuit 168 in the verification circuit 165. The comparison circuit 168 conducts comparison inspection and if the result is a mismatch, the operation of the second decryption circuit Y 34 is stopped. Accordingly, the validity of the first constant IDfuse/address stored in the seed generation section 131 can be verified.

Thus, according to the security information implementation system of the embodiment, when the address corresponding to IDfuse of the identification information unique to each LSI is output to the outside, the address is not output as it is and is output as the conversion address information (address') provided by the arithmetic circuit B 153 of the conversion circuit 151 (exclusive logic, etc.,). At the time, switching is performed so that the inspection constant aaatst (seventh constant) is input at the inspection stage and the constant aaa (sixth constant) is input at the implementation stage. Further, the constant aaa is input as nodata (any desired data) from the outside at the implementation stage for distributing nodata among the set manufacturers, whereby resistance to tampering can be improved.

In the seed generation section 131 of the embodiment, the third constant Const common to a given number of LSIs and IDfuse unique to each LSI can be switched in the mode switching portion (mode 137, selector 135, selector 136), so that flexibility for implementation of the security information can be improved.

For example, if the security information is implemented and stored in the storage section 120a using the constant Const, writing (implementing time) can be shortened although the security is degraded to some extent. On the other hand, if the security information is stored using IDfuse unique to each LSI, the security can be enhanced although the writing time is prolonged.

Thus, the constant Const and IDfuse are switched in response to the amount of data to be stored in the storage section 120a. That is, if the data amount is small (the keys, etc., are in small data amount and the security needs to be secured), the security takes precedence over the implementing time and therefore the security information is associated with IDfuse for storage (EDK (MK)/address' 171, etc.,). On the other hand, if the data amount is large (the programs, etc., are in large data amount and the security need not much be secured), the implementing time takes precedence over the security and therefore the security information is stored using the constant value Const (EDK2 (MK2)/const 173, etc.,), and flexibility for implementation of the security information can be improved.

EXAMPLE 2

FIG. 16 shows the configuration wherein the LSI 120b is further provided with a security processing circuit 141a or 141b inputting the final security information DK output from the second decryption circuit Y 34 in the security information implementation system 120 of the embodiment.

The selector 135 selects and outputs IDfuse according to the first mode setup value as with the example described above and at this time, the first encrypted security information EDK (MK)/address' and the second encrypted security information EMK (CK)/address' are input, whereby the final security information DK is obtained. The final security information DK is used for the security processing circuit 141a and next the selector 135 selects and outputs const according to the first mode setup value and at this time, the third encrypted security information EDK (MK)/const and the fourth encrypted security information EMK (CK)/const are input, whereby the final security information DK2 is obtained. The final security information DK2 is used for the security processing circuit 141b different from the security processing circuit 141a.

According to the embodiment, the final security information DK and DK2 can be used for different applications of encryption processing. Accordingly, the encrypted security information can be implemented flexibly.

EXAMPLE 3

Figure 17:
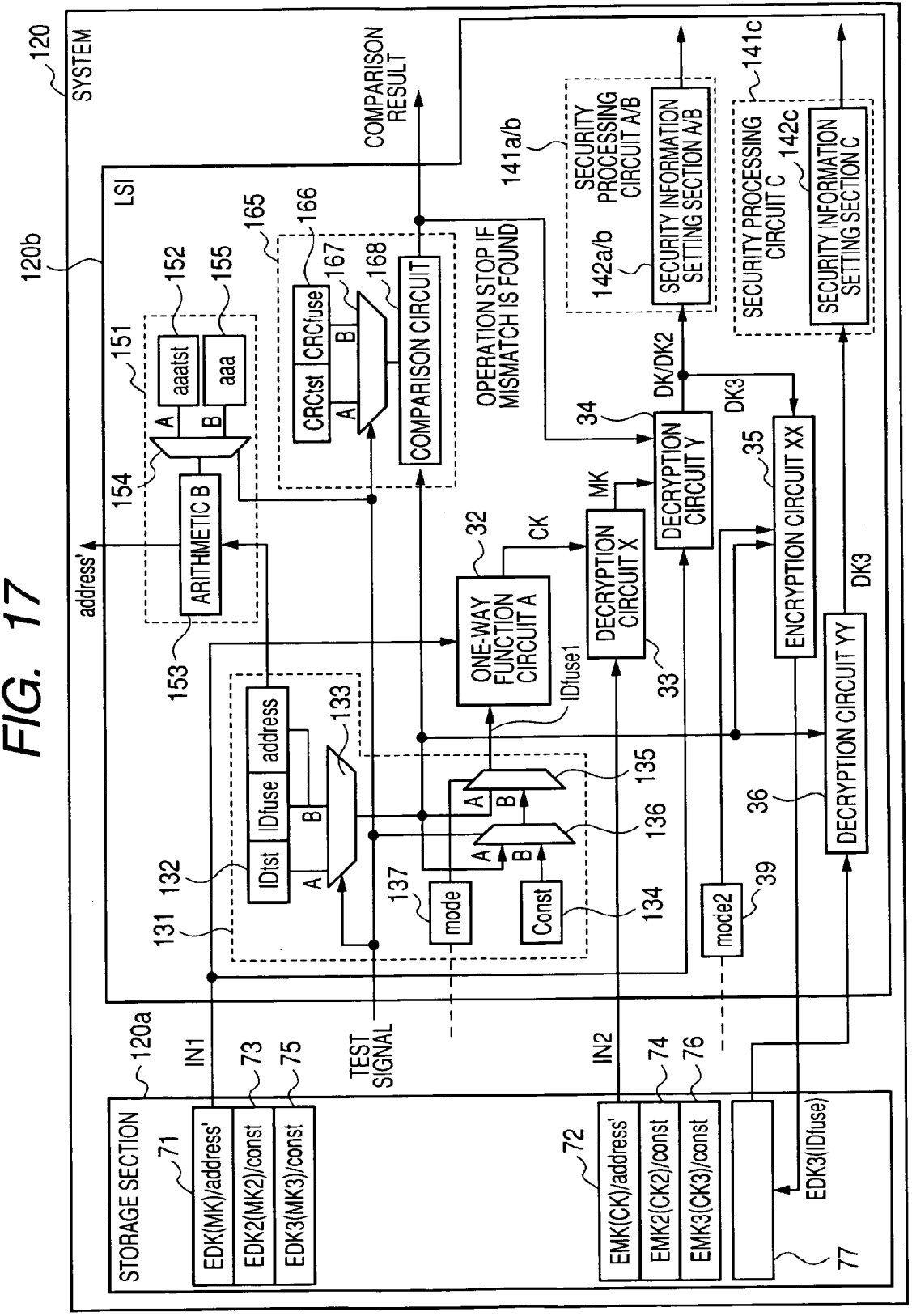
FIG. 17 is a circuit diagram to describe the schematic configuration of the security information implementation system 120 at the security information implementation stage in a set when LSI generates security information based on IDfuse information proper to each LSI in the embodiment of the invention.

FIG. 17 shows the configuration wherein final security information DK3 output from the decryption circuit Y 34 is again encrypted according to fifth encrypted security information and sixth encrypted security information to generate seventh encrypted security information in the storage section 120a aside from the final security information DK and DK2 output from the second decryption circuit Y 34 in the security information implementation system 120 of the embodiment.

In FIG. 17, IDfuse implementation, LSI inspection, and the like are executed as in example 1 and therefore will not be discussed again in example 3. Set operation inspection (usual mode operation) and the later will be discussed.

In the set operation inspection, the first selector 133 receives "0" as the test signal TEST and selects and outputs the first constant value IDfuse/address stored in the first constant value storage section 132.

To use the first encrypted security information EDK (MK)/address' and the second encrypted security information EMK (CK)/address', the first mode setup value is set to "1." Accordingly, the second selector 135 selects and outputs IDfuse output from the first selector 133, whereby the conversion seed IDfuse1 is output from the seed generation section 131.

The first one-way function circuit A 32 converts the conversion seed IDfuse1 output from the seed generation section 131 by a one-way function corresponding to the function used to generate the conversion security information CK using the first encrypted security information EDK (MK)/address'. Accordingly, the one-way function circuit A 32 generates and outputs the conversion security information CK.

The first decryption circuit X 33 decrypts the second encrypted security information EMK (CK)/address' using the output of the first one-way function circuit A 32, namely, the conversion security information CK as a key. Accordingly, the first decryption circuit X 33 generates and outputs internal security information MK. The second decryption circuit Y 34 decrypts the first input IN1, namely, the first test encrypted security information EDK (MK) using the output of the first decryption circuit X 33, namely, the internal security information MK as a key. Accordingly, the second decryption circuit Y 34 generates final security information DK.

Next, to use the third encrypted security information EDK2 (MK2)/Const and the fourth encrypted security information EMK2 (CK2)/Const, the first mode setup value is set to "0." Accordingly, the second selector 135 selects and outputs Const selected in response to "0" as the test signal TEST from the third selector 136, and conversion seed Const1 is output from the seed generation section 131.

The first one-way function circuit A 32 converts the conversion seed Const1 output from the seed generation section 131 by a one-way function corresponding to the function used to generate the conversion security information CK2 using the third encrypted security information EDK2 (MK2)/Const. Accordingly, the one-way function circuit A 32 generates and outputs the conversion security information CK2.

The first decryption circuit X 33 decrypts the fourth encrypted security information EMK2 (CK2)/Const using the output of the first one-way function circuit A 32, namely, the conversion security information CK2 as a key. Accordingly, the first decryption circuit X 33 generates and outputs internal security information MK2. The second decryption circuit Y 34 decrypts the first input IN1, namely, the third encrypted security information EDK2 (MK2)/Const using the output of the first decryption circuit X 33, namely, the internal security information MK2 as a key. Accordingly, the second decryption circuit Y 34 generates final security information DK2.

Here, the final security information DK and the final security information DK2 are set in the security processing circuit A 141a or B 141b as the final security information.

At this time, the fifth selector 167 receives "0" as the test signal TEST and selects and outputs the verification constant value CRCfuse/address stored in the third constant value storage section 166. The output of the fifth selector 167 is input to the comparison circuit 168. The output of the first selector 133 is also input to the comparison circuit 168 in the verification circuit 165. The comparison circuit 168 conducts comparison inspection and if the result is a mismatch, the operation of the second decryption circuit Y 34 is stopped. Accordingly, the validity of the first constant value IDfuse/address stored in the seed generation section 131 can be verified.

Next, to use fifth encrypted security information EDK3 (MK3)/Const and sixth encrypted security information EMK3 (CK3)/Const, the first mode setup value is set to "0." Accordingly, the second selector 135 selects and outputs Const selected in response to "0" as the test signal TEST from the third selector 136, and conversion seed Const1 is output from the seed generation section 131.

The first one-way function circuit A 32 converts the conversion seed Const1 output from the seed generation section 131 by a one-way function corresponding to the function used to generate the conversion security information CK3 using the fifth encrypted security information EDK3 (MK3)/Const. Accordingly, the one-way function circuit A 32 generates and outputs the conversion security information CK3.

The first decryption circuit X 33 decrypts the sixth encrypted security information EMK3 (CK3)/Const using the output of the first one-way function circuit A 32, namely, the conversion security information CK3 as a key. Accordingly, the first decryption circuit X 33 generates and outputs internal security information MK3. The second decryption circuit Y 34 decrypts the first input IN1, namely, the fifth encrypted security information EDK3 (MK3)/Const using the output of the first decryption circuit X 33, namely, the internal security information MK3 as a key. Accordingly, the second decryption circuit Y 34 generates final security information DK3.

Next, a second mode setup value 39 separate from the first mode setup value 137 is set to "1." Accordingly, the operation of a first encryption circuit XX 35 is enabled. The final security information DK3 is input to the first encryption circuit XX 35, which then encrypts the final security information DK3 using the first constant value IDfuse to generate seventh encrypted security information EDK3 (IDfuse). The seventh encrypted security information EDK3 (IDfuse) is output to the outside of the LSI 120b and is written into a storage part 177 of the storage section 120a.

After the seventh encrypted security information EDK3 (IDfuse) is written, the fifth encrypted security information EDK3 (MK3)/Const and the sixth encrypted security information EMK3 (CK3)/Const may be erased. At this stage, the implementation on the set is complete and the seventh encrypted security information EDK3 (IDfuse) is input to the LSI 120b as inspection of the final operation (usual mode operation). Here, the seventh encrypted security information EDK3 (IDfuse) is input to a third decryption circuit YY 36, which then decrypts the seventh encrypted security information EDK3 (IDfuse) using the first constant value IDfuse as a key and outputs final security information DK3. Here, the final security information DK3 is set in a security processing circuit C 141c as the final security information and inspection of the usual operation is executed.

According to the embodiment, if is also made possible to again encrypt the final security information DK3 according to IDfuse for output, so that flexibility can be improved for implementation of each piece of the encrypted security information.

In the embodiment, to add security information to the storage section 120a, from the viewpoint of efficiency of the implementation processing, the security information is once implemented according to the constant value const and then is encrypted using IDfuse implemented in the LSI and the encrypted security information EDK3 (IDfuse) 177 is implemented. Then, security information EDK3 (MK3)/const 175 and EMK3 (CK3)/const 176 implemented according to the constant value const are deleted from the storage section 120a.

Accordingly, the security information can be implemented flexibly. It would be good if security information can be implemented with a sole key from the beginning; in this case, however, key management becomes necessary so that the key assigned to the added security information can be selected. Since it is difficult to conduct such key management, the security information is once implemented according to the constant value const and then is encrypted using the sole key IDfuse implemented in the LSI and then the encrypted security information is written into the storage section 120a, whereby the flexibility of implementation of the security information can be improved.

EXAMPLE 4

Figure 18:
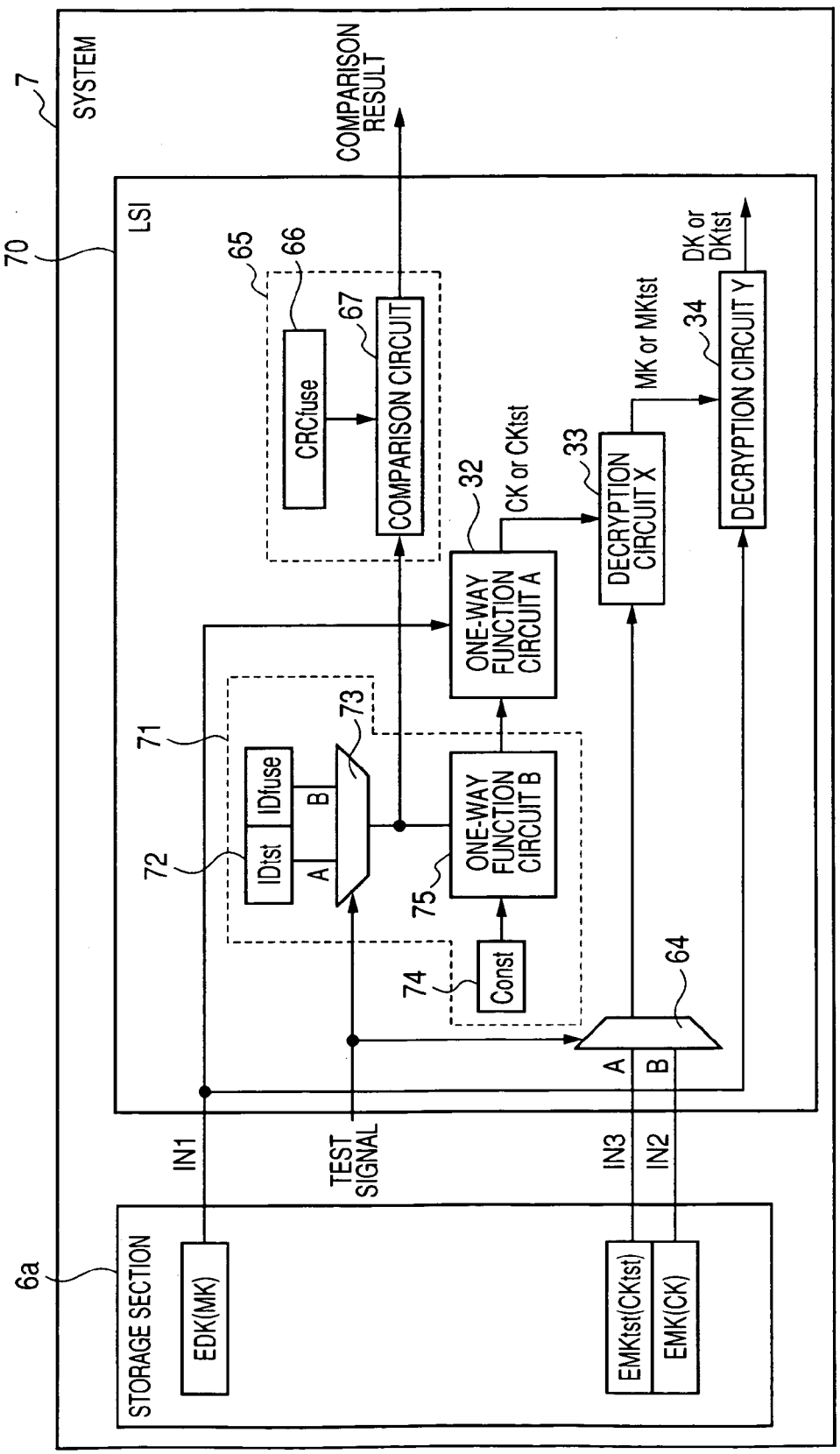
FIG. 18 is a block diagram to show the schematic configuration of a key implementation system 7 to describe the system.
Figure 19:
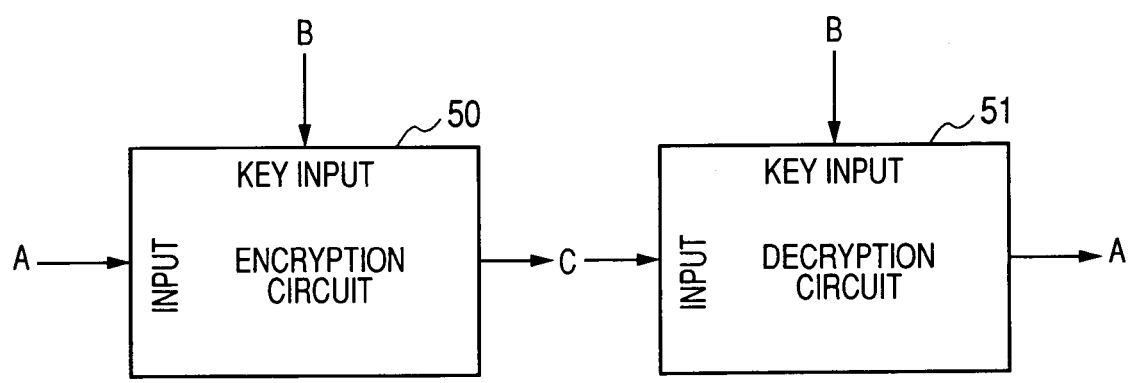
FIG. 19 is a drawing to describe the characteristic of symmetric cryptography.
Figure 20:
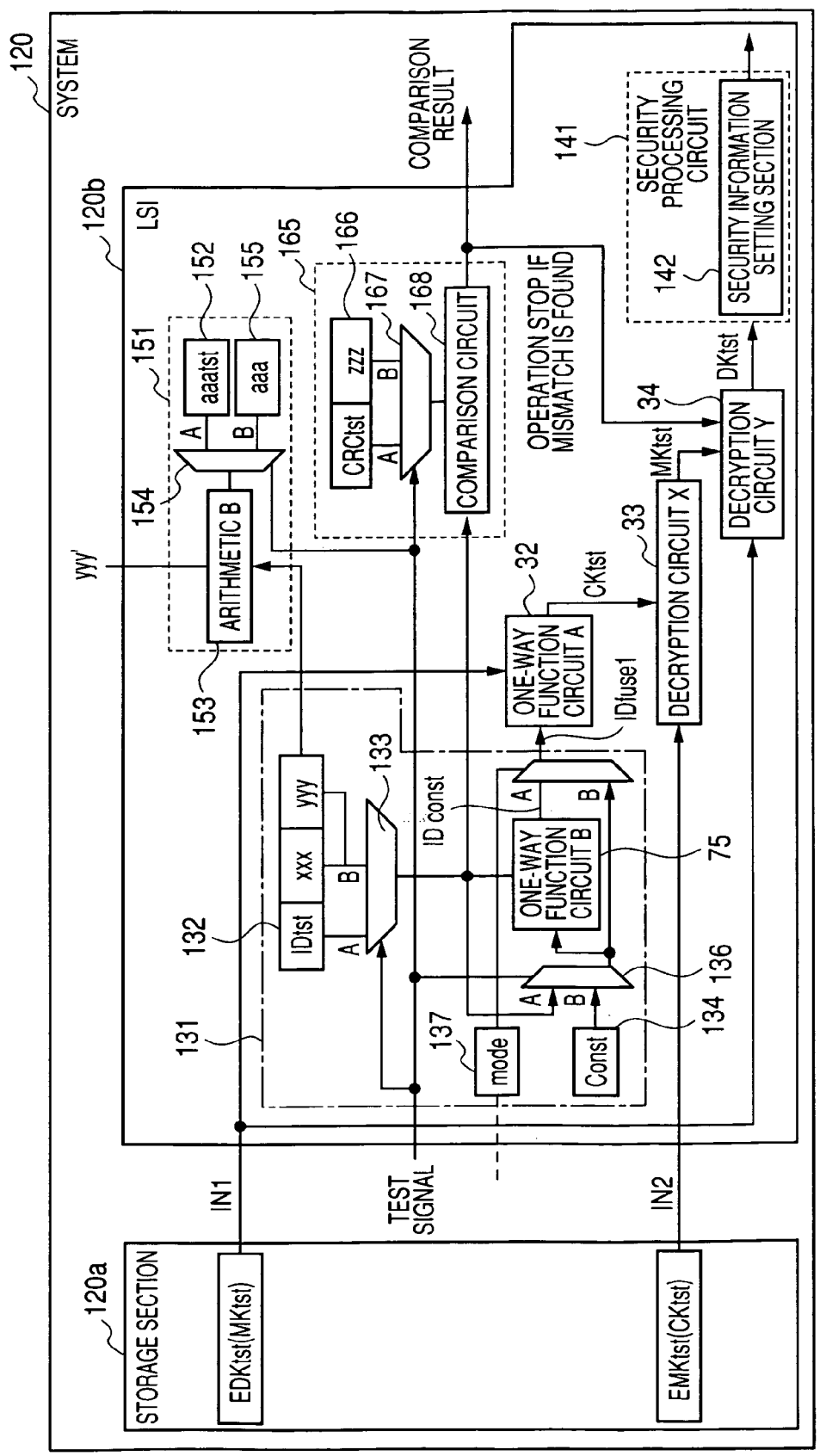
FIG. 20 is a block diagram to describe a seed generation method based on IDfuse information in a configuration equivalent to the key implementation system 7 (FIG. 18)

FIG. 20 shows the configuration wherein the LSI 120b is provided with a second one-way function circuit B 75 used to generate conversion seed by using the first constant value IDfuse as a key and inputting the third constant value Const as with the key implementation system 7 in FIG. 18 in the security information implementation system 120 of the embodiment.

Figure 21:
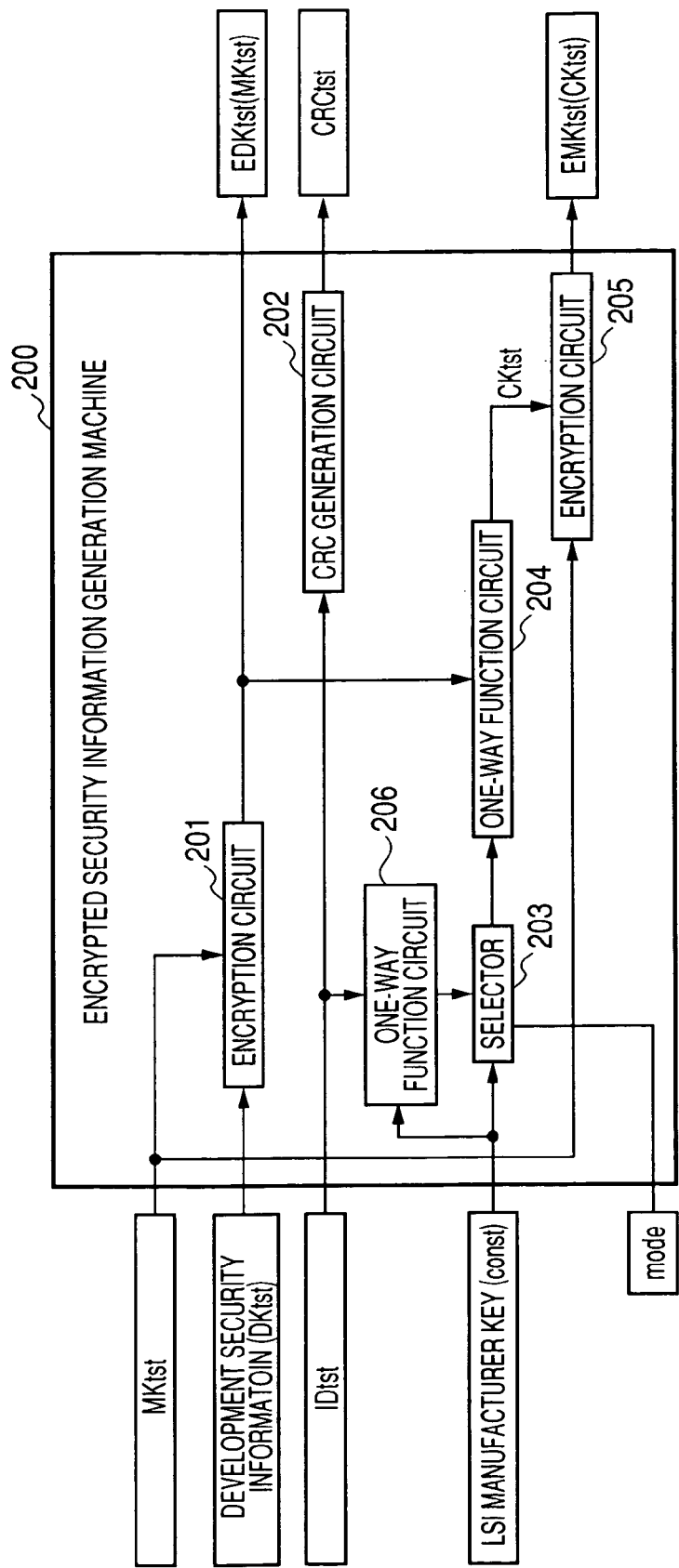
FIG. 21 is a block diagram to describe the encrypted security information generation machine 200 for generating encrypted security information in the example in FIG. 20.
Figure 22:
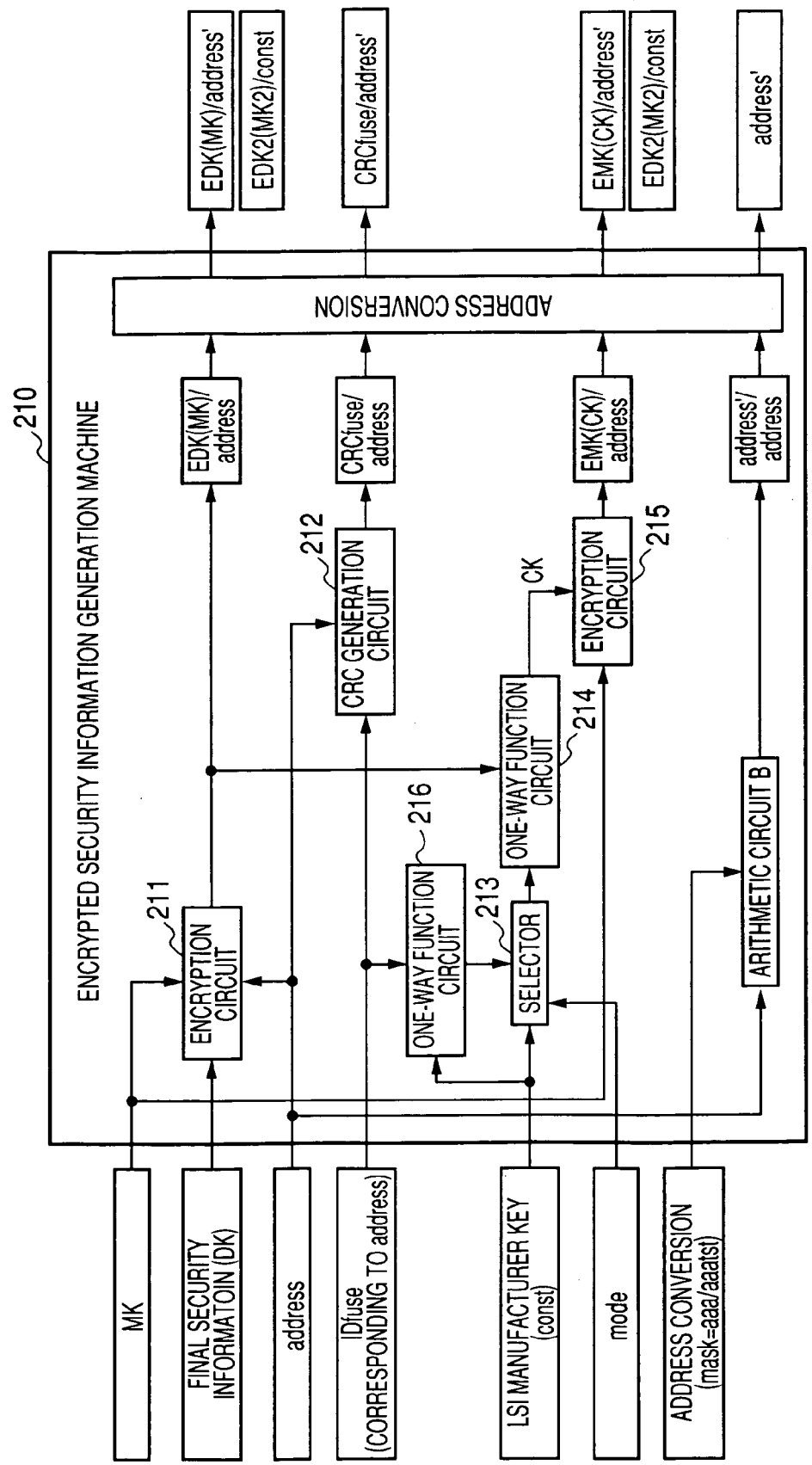
FIG. 22 is a block diagram to describe the encrypted security information generation machine 210 for generating encrypted security information in the example in FIG. 20.

FIGS. 21 and 22 are block diagrams to describe the encrypted security information generation machines 200 and 210 for generating encrypted security information in example 4.

In FIG. 21, the encrypted security information generation machine 200 generates the encrypted security information to be provided for the LSI vendor A 230. That is, the encryption circuit 201 encrypts development security information DKtst using test internal security information MKtst as a key to generate first development encrypted information EDKtst (MKtst).

Next, the selector 203 inputs an LSI manufacturer key const using a selected test constant value IDtst according to a first mode setup value as a key and outputs a conversion seed. Here, to inspect the value of the LSI manufacturer key const, the first mode setup value may be set so that the selector 203 outputs the LSI manufacturer key const. Further, the one-way function circuit 204 converts the conversion result by a one-way function using the first development encrypted information EDKtst (MKtst) generated by the encryption circuit 201 as a key to generate a test conversion key CKtst.

Then, the encryption circuit 205 encrypts the test internal security information MKtst using the test conversion key CKtst output from the one-way function circuit 204 as a key to generate second development encrypted information EMKtst (CKtst). The CRC generation circuit 202 performs redundancy operation (for example, CRC 16) on the test constant value IDtst to generate a verification test constant value CRCtst.

In FIG. 22, the encryption circuit 211 encrypts final security information DK using internal security information MK corresponding to the address as a key to generate first encrypted security information EDK (MK)/address associated with the address.

Next, the selector 213 inputs the LSI manufacturer key const using constant value IDfuse/address corresponding to the selected address according to the first mode setup value as a key and outputs a conversion seed. Further, the one-way function circuit 214 converts the result by a one-way function using the first encrypted security information EDK (MK)/ address generated by the encryption circuit 211 as a key to generate a conversion key CK.

Then, the internal security information MK is encrypted using the conversion security information CK and address generated by the one-way function circuit 214 as a key to generate second encrypted security information EMK (CK)/ address. A CRC generation circuit 212 performs redundancy operation (for example, CRC 16) on the constant value IDfuse/address corresponding to the address to generate a verification constant value CRCfuse/address corresponding to the address. Further, the encrypted security information generation machine 210 executes address conversion (mask) of the first encrypted security information EDK (MK)/address, the second encrypted security information EMK (CK)/address, and the verification constant value CRCfuse/address to a conversion address address' and outputs the conversion address address' and generates the first encrypted security information EDK (MK)/address', the second encrypted security information EMK (CK)/address', and the verification constant value CRCfuse/address' associated with address' corresponding to the address. Further, the information pieces are sorted in the numeric order of address'.

Further, the encrypted security information generation machine 210 switches so that the selector 213 selects the LSI manufacturer key const according to the first mode setup value and performs processing similar to that described above to generate third encrypted security information EDK2 (MK2)/const and fourth encrypted security information EMK2 (CK2)/const.

The information thus generated is provided for the LSI manufacturer, the fuse implementation vendor, and the set manufacturer for implementation as with example 1. Only the inspection stage in the set manufacturer differs from that in example 1 and therefore the operation at the inspection stage in the set manufacturer (usual mode operation) based on FIG. 20 will be discussed below:

In inspection of the set operation, the first selector 133 receives "0" as the test signal TEST and selects and outputs the first constant value IDfuse/address stored in the first constant value storage section 132. The second one-way function circuit B 75 converts the third constant value Const by a one-way function using the output of the first selector 133, namely, the first constant value IDfuse as a key, and outputs IDconst.

To use the first encrypted security information EDK (MK)/address' and the second encrypted security information EMK (CK)/address', the first mode setup value is set to "1." Accordingly, the second selector 135 selects and outputs IDconst output from the second one-way function circuit B 75, whereby the conversion seed IDfuse1 is output from the seed generation section 131.

The first one-way function circuit A 32 converts the conversion seed IDfuse1 output from the seed generation section 131 by a one-way function corresponding to the function used to generate the conversion security information CK using the first encrypted security information EDK (MK)/address'. Accordingly, the one-way function circuit A 32 generates and outputs the conversion security information CK.

The first decryption circuit X 33 decrypts the second encrypted security information EMK (CK)/address' using the output of the first one-way function circuit A 32, namely, the conversion security information CK as a key. Accordingly, the first decryption circuit X 33 generates and outputs internal security information MK. The second decryption circuit Y 34 decrypts the first input IN1, namely, the first test encrypted security information EDK (MK) using the output of the first decryption circuit X 33, namely, the internal security information MK as a key. Accordingly, the second decryption circuit Y 34 generates final security information DK.

Next, to use the third encrypted security information EDK2 (MK2)/Const and the fourth encrypted security information EMK2 (CK2)/Const, the first mode setup value is set to "0." Accordingly, the second selector 135 selects and outputs Const selected in response to "0" as the test signal TEST from the third selector 136, and conversion seed Const1 is output from the seed generation section 131.

The first one-way function circuit A 32 converts the conversion seed Const1 output from the seed generation section 131 by a one-way function corresponding to the function used to generate the conversion security information CK2 using the third encrypted security information EDK2 (MK2)/Const. Accordingly, the one-way function circuit A 32 generates and outputs the conversion security information CK2.

The first decryption circuit X 33 decrypts the fourth encrypted security information EMK2 (CK2)/Const using the output of the first one-way function circuit A 32, namely, the conversion security information CK2 as a key. Accordingly, the first decryption circuit X 33 generates and outputs internal security information MK2. The second decryption circuit Y 34 decrypts the first input IN1, namely, the third encrypted security information EDK2 (MK2)/Const using the output of the first decryption circuit X 33, namely, the internal security information MK2 as a key. Accordingly, the second decryption circuit Y 34 generates final security information DK2.

Here, the final security information DK and the final security information DK2 are set in the security processing circuit A 141a or B 141b as the final security information.

At this time, the fifth selector 167 receives "0" as the test signal TEST and selects and outputs the verification constant value CRCfuse/address stored in the third constant value storage section 166. The output of the fifth selector 167 is input to the comparison circuit 168. The output of the first selector 133 is also input to the comparison circuit 168 in the verification circuit 165. The comparison circuit 168 conducts comparison inspection and if the result is a mismatch, the operation of the second decryption circuit Y 34 is stopped. Accordingly, the validity of the first constant value IDfuse/address stored in the seed generation section 131 can be verified.

According to the embodiment, IDfuse and const are converted by the one-way function for the implementation method based on example 1, whereby the concealment of the security information for an entity analysis can be furthermore improved.

The security information implementation system and the LSI of the invention have the advantage that the address information is associated with the encrypted security information, whereby it is made possible to identify from a terminal, a system LSI, or a storage section drained out by fraudulent means, the manufacturer, etc., manufacturing the terminal, the system LSI, or the storage section for strictly managing the security information, and are useful as a security information implementation system and an LSI for providing the system or the like.

What is claimed is:

1. A security information implementation system, comprising:
a storage section, storing first encrypted security information provided by encrypting first final security information according to first internal security information and second encrypted security information provided by encrypting the first internal security information according to first conversion security information; and
an LSI, the LSI comprising:
a seed generation section for,
storing a first constant value which separately contains a constant value and address information, which is unique to the LSI and independent from the constant value, a first conversion seed being generated based on the constant value; a second constant value based on which a test conversion seed is generated; and a third constant value, and outputting the constant value obtained by excluding the address information from the first constant value as the first conversion seed, the second constant value as the test conversion seed or the third constant value in response to a test signal and a mode setup value;
a one-way function circuit, converting the first conversion seed or the test conversion seed output from the seed generation section according to the first encrypted security information input from said storage section to generate the first conversion security information;
a first decryption circuit, decrypting the second encrypted security information input from said storage section by using the output of the one-way function circuit as a key;
a second decryption circuit, decrypting the first encrypted security information input from said storage section by using the output of the first decryption circuit as a key;
an arithmetic circuit to which only the address information contained in the first constant value is input and which output conversion address information in response to the test signal, wherein:
the security information implementation system is configured to perform a function of inspecting the unique property according to a conversion address information output from the arithmetic circuit,
the first constant value is a constant value unique for said LSI, and
the third constant value is a constant value unique every predetermined number of LSIs.

2. The security information implementation system as claimed in claim 1, wherein:
the storage section further stores third encrypted security information provided by encrypting second final security information according to second internal security information and fourth encrypted security information provided by encrypting the second internal security information according to second conversion security information,
the seed generation section outputs the constant value obtained by excluding the address information from the first constant value as the first conversion seed, the second constant value as the test conversion seed, or the third constant value as a second conversion seed in response to the test signal and the mode setup value,
the one-way function circuit converts the first conversion seed, the test conversion seed, or the second conversion seed output from the seed generation section by using the first encrypted security information or the third encrypted security information input from said storage section to generate the first or second conversion security information
the first decryption circuit decrypts the second encrypted security information or the fourth encrypted security information input from said storage section using the output of the one-way function circuit as a key,
the second decryption circuit decrypts the first encrypted security information or the third encrypted security information input from the storage section, by using the output of the first decryption circuit as a key, and
the third constant value is a generation source of the second conversion seed.

3. The security information implementation system as claimed in claim 1, wherein the seed generation section further comprises:
a first constant value storage section, storing the first constant value and the second constant value;
a second constant value storage section, storing the third constant value;
a first selector, selecting and outputting the first constant value and the second constant value in response to the test signal;
a second selector, selecting and outputting the second constant value and the third constant value in response to the test signal; and
a third selector, selecting and outputting the output of the first selector and the output the second selector in response to the mode setup value.

4. The security information implementation system as claimed in claim 1, wherein the mode setup value is changed only in a specific operation mode.

5. The security information implementation system as claimed in claim 1, wherein:
the arithmetic circuit is configured to perform a predetermined operation on a sixth constant value at an implementation stage or a seventh constant value at an inspection stage selected according to the test signal and outputs first conversion address information or second conversion address information.

6. The security information implementation system as claimed in claim 2, wherein first security information generated according to the first encrypted security information and the second encrypted security information and second security information generated according to the third encrypted security information and the fourth encrypted security information are used separately for different security information processing.

7. The security information implementation system as claimed in claim 2, wherein at least the first encrypted security information and the second encrypted security information or the third encrypted security information and the fourth encrypted security information are implemented.

8. The security information implementation system as claimed in claim 5, wherein the arithmetic circuit selects the seventh constant value and outputs the second conversion address information at an inspection stage, and selects the sixth constant value and outputs the first conversion address information at an implementation stage.

9. The security information implementation system as claimed in claim 8, further comprising a unit for inputting and setting the sixth constant value from the outside.

10. The security information implementation system as claimed in claim 8, wherein the first encrypted security information and the second encrypted security information stored in said storage section are associated with the first conversion address information output from the arithmetic circuit.

11. The security information implementation system as claimed in claim 8, wherein the final security information and the internal security information are associated with the first conversion address information.

12. The security information implementation system as claimed in claim 8, wherein the first encrypted security information and the second encrypted security information are arranged in the order of the first conversion address information.

13. The security information implementation system as claimed in claim 1, further comprising a security processing circuit block for performing security processing including encryption processing or tampering detection processing for the output of the second decryption circuit.

14. The security information implementation system as claimed in claim 5, further comprising a function of stopping implementation if the same values are implemented as the second conversion address information.

15. The security information implementation system as claimed in claim 8, further comprising a unit for prohibiting output at the test time of the first conversion address information.

16. An LSI to which first encrypted security information provided by encrypting first final security information according to first internal security information and second encrypted security information provided by encrypting the first internal security information according to first conversion security information are input, said LSI comprising:
   a seed generation section for
      storing a first constant value which separately contains a constant value and address information, which is unique to the LSI and independent from the constant value, a first conversion seed being generated based on the constant value; a second constant value based on which a test conversion seed is generated and a third constant value, and
      outputting the constant value obtained by excluding the address information from the first constant value as the first conversion seed, the second constant value as the test conversion seed or the third constant value in response to a test signal and a mode setup value;
   a one-way function circuit for converting the first conversion seed or the test conversion seed output from said seed generation section according to the first encrypted security information to generate the first conversion security information;
   a first decryption circuit for decrypting the second encrypted security information by using the output of said one-way function circuit as a key;
   a second decryption circuit for decrypting the first encrypted security information by using the output of said first decryption circuit as a key; and
   an arithmetic circuit to which only the address information contained in the first constant value is input and which output conversion address information in response to the test signal, wherein:
   the LSI is configured to perform a function of inspecting the unique property according to a conversion address information output from the arithmetic circuit,
   the first constant value is a constant value unique for said LSI, and
   the third constant value is a constant value unique every predetermined number of LSIs.

17. The LSI as claimed in claim 16, wherein:
   said seed generation section outputs the constant value obtained by excluding the address information from the first constant value as the first conversion seed, the second constant value as the test conversion seed, or the third constant value as a second conversion seed in response to the test signal and the mode setup value,
   said one-way function circuit converts the first conversion seed, the test conversion seed, or the second conversion seed output from said seed generation section by using the first encrypted security information or third encrypted security information input from said storage section to generate the first or second conversion security information
   said first decryption circuit decrypts the second encrypted security information or fourth encrypted security information provided by encrypting second internal security information according to second conversion security information by using the output of said one-way function circuit as a key,
   the second decryption circuit decrypts the first encrypted security information or the third encrypted security information input from the storage section, by using the output of the first decryption circuit as a key, the third encrypted security information being provided by encrypting second final security information according to the second internal security information, and
   the third constant value is a generation source of the second conversion seed.

18. The LSI as claimed in claim 16, further comprising a verification circuit for verifying the first constant value or the second constant value stored in said seed generation section in response to the test signal.

19. The LSI as claimed in claim 16, wherein the mode setup value is implemented with a fuse in a state in which change in the mode setup value after being implemented is prohibited.

20. The LSI as claimed in claim 16, wherein the first constant value, the second constant value, the third constant value, a fourth constant value corresponding to the result of redundancy operation on the first constant value, a fifth constant value corresponding to the result of redundancy operation on the second constant value, a sixth constant value at the implementation stage, and a seventh constant value at the inspection stage are implemented so that they cannot be externally read.

21. The security information implementation system as claimed in claim 2, wherein:
   the storage section further stores fifth encrypted security information provided by encrypting third final security information according to third internal security information, and sixth encrypted security information provided by encrypting the third internal security information according to third conversion security information, and
   the LSI further comprises:
      an encryption circuit for encrypting the third final security information provided according to the fifth encrypted security information and the sixth encrypted security information by using the first constant value as a key in response to a second mode setup value separate from the mode setup value and outputting seventh encrypted security information to said storage section; and
      a third decryption circuit for decrypting the seventh encrypted security information input from said storage section by using the first constant value as a key.

22. The security information implementation system as claimed in claim 21, wherein at least one pair of the first encrypted security information and the second encrypted security information, the third encrypted security information and the fourth encrypted security information, and the fifth encrypted security information and the sixth encrypted security information is implemented.

23. The security information implementation system as claimed in claim 1, wherein
   the LSI further includes a verification circuit that verifies the first constant value or the second constant value stored in the seed generation section in response to the test signal.

24. The LSI as claimed in claim 16, wherein the seed generation section further comprises:
   a first constant value storage section storing the first constant value and the second constant value;
   a second constant value storage section storing the third constant value;
   a first selector for selecting and outputting the first constant value and the second constant value in response to the test signal;

a second selector for selecting and outputting the second constant value and the third constant value in response to the test signal; and a third selector for selecting and outputting the output of the first selector and the output of the second selector in response to the mode setup value.

25. The LSI as claimed in claim 16, wherein the mode setup value is changed only in a specific operation mode.

26. The LSI as claimed in claim 16, wherein the arithmetic circuit is configured to perform a predetermined operation on a sixth constant value at an implementation stage or a seventh constant value at an inspection stage selected according to the test signal and outputs first conversion address information or second conversion address information.

27. The LSI as claimed in claim 17, wherein first security information generated according to the first encrypted security information and the second encrypted security information and second security information generated according to the third encrypted security information and the fourth encrypted security information are used separately for different security information processing.

28. The LSI as claimed in claim 17, wherein at least the first encrypted security information and the second encrypted security information or the third encrypted security information and the fourth encrypted security information are implemented.

29. The LSI as claimed in claim 26, wherein the arithmetic circuit selects the seventh constant value and outputs the second conversion address information at an inspection stage, and selects the sixth constant value and outputs the first conversion address information at an implementation stage.

30. The LSI as claimed in claim 29, further comprising a unit for inputting and setting the sixth constant value from the outside.

31. The LSI as claimed in claim 29, wherein the first encrypted security information and the second encrypted security information stored in said storage section are associated with the first conversion address information output from the arithmetic circuit.

32. The LSI as claimed in claim 29, wherein the final security information and the internal security information are associated with the first conversion address information.

33. The LSI as claimed in claim 29, wherein the first encrypted security information and the second encrypted security information are arranged in the order of the first conversion address information.

34. The LSI as claimed in claim 16, further comprising a security processing circuit block for performing security processing including encryption processing or tampering detection processing for the output of the second decryption circuit.

35. The LSI as claimed in claim 16, wherein:
the first constant value is a constant value unique for said LSI, and
the third constant value is a constant value unique every predetermined number of LSIs.

36. The LSI as claimed in claim 26, further comprising a function of stopping implementation if the same values are implemented as the second conversion address information.

37. The LSI as claimed in claim 29, further comprising a unit for prohibiting output at an inspection stage of the first conversion address information.

* * * * *